(12) United States Patent
Hisada et al.

(10) Patent No.: US 6,902,018 B2
(45) Date of Patent: Jun. 7, 2005

(54) ELECTRIC VEHICLE DRIVE CONTROL APPARATUS, ELECTRIC VEHICLE DRIVE CONTROL METHOD, AND PROGRAM THEREOF

(75) Inventors: Hideki Hisada, Anjo (JP); Kazuo Aoki, Anjo (JP); Shitomi Yanagawa, Anjo (JP)

(73) Assignee: Aisin AW, Anjo (JP)

( * ) Notice: Subject to any disclaimer, the term of this patent is extended or adjusted under 35 U.S.C. 154(b) by 204 days.

(21) Appl. No.: 10/207,101

(22) Filed: Jul. 30, 2002

(65) Prior Publication Data
US 2003/0034187 A1 Feb. 20, 2003

(30) Foreign Application Priority Data

Aug. 10, 2001 (JP) ........................................ 2001-244542

(51) Int. Cl.⁷ ............................................. H01M 10/44
(52) U.S. Cl. ..................................... 180/65.1; 320/132
(58) Field of Search ............................... 180/65.1, 65.2, 180/65.3, 65.4, 65.6, 65.7; 320/103, 104, 132; 701/22

(56) References Cited

U.S. PATENT DOCUMENTS

| | | | |
|---|---|---|---|
| 5,713,814 A | 2/1998 | Hara et al. | |
| 5,808,428 A | 9/1998 | Ito et al. | |
| 6,018,694 A | 1/2000 | Egami et al. | |
| 6,333,620 B1 * | 12/2001 | Schmitz et al. | 320/132 |
| 6,757,598 B2 | 7/2002 | Okoshi | |
| 6,500,089 B2 * | 12/2002 | Lasson et al. | 477/3 |
| 6,583,599 B1 * | 6/2003 | Phillips et al. | 320/104 |
| 6,637,530 B1 * | 10/2003 | Endo et al. | 180/65.2 |
| 6,651,759 B1 * | 11/2003 | Gruenwald et al. | 180/65.2 |
| 6,659,213 B2 * | 12/2003 | Kubo et al. | 180/65.4 |
| 6,696,815 B1 * | 2/2004 | Kikuchi | 320/104 |
| 6,700,353 B2 * | 3/2004 | Asada | 322/28 |
| 6,737,822 B2 * | 5/2004 | King | 318/375 |
| 6,740,002 B1 * | 5/2004 | Stridsberg | 477/14 |

FOREIGN PATENT DOCUMENTS

| | | |
|---|---|---|
| EP | 0 429 058 A2 | 5/1991 |
| JP | A 61-262006 | 11/1986 |
| JP | A 5-130709 | 5/1993 |
| JP | A 10-243503 | 9/1998 |

* cited by examiner

Primary Examiner—Christopher P. Ellis
Assistant Examiner—J. Allen Shriver
(74) Attorney, Agent, or Firm—Oliff & Berridge, PLC

(57) ABSTRACT

An electric vehicle drive control apparatus has an electric machine; a battery; an inverter that is driven in accordance with a drive signal, and that receives DC current from the battery and produces phase currents, and that supplies the phase currents to the electric machine; a battery voltage detection device that detects the battery voltage; and an electric machine torque restriction processing device that determines whether the battery voltage is higher than a threshold value, and restricts the electric machine torque if the battery voltage is higher than the threshold value. If the battery voltage becomes higher than the threshold value, the electric machine torque is restricted. Therefore, increases in the load on the inverter can be prevented.

15 Claims, 20 Drawing Sheets

ELECTRIC VEHICLE DRIVE CONTROL APPARATUS, ELECTRIC VEHICLE DRIVE CONTROL METHOD, AND PROGRAM THEREOF

BACKGROUND OF THE INVENTION

1. Field of Invention

The invention relates to an electric vehicle drive control apparatus, an electric vehicle drive control method, and a program thereof.

2. Description of Related Art

In a conventional electric vehicle drive control apparatus installed in an electric vehicle, so as to generate torque of a drive motor, that is, drive motor torque, and transfer the drive motor torque to driving wheels, the drive motor receives direct current from a battery and is thereby driven at the time of power running (driving) so as to generate drive motor torque. At the time of regeneration (electric power generation), the drive motor receives torque due to inertia of the electric vehicle, and generates DC current, and sends the current to the battery.

Therefore, in the aforementioned electric vehicle drive control apparatus, an inverter is disposed between the drive motor and a drive motor control device. The inverter is driven based on a drive signal from the drive motor control device. At the time of power running, the inverter receives DC current from the battery, and causes the generation of U-phase, V-phase and W-phase currents, and sends the phase currents to the drive motor. At the time of regeneration associated with the braking of the electric vehicle, the inverter receives the phase currents from the drive motor, and causes the generation of DC current, and sends the current to the battery.

However, in the above-described conventional electric vehicle drive control apparatus, if the voltage of the battery, that is, the battery voltage, becomes high, for example, as in a case where the electric vehicle is run on a long downhill, the load on the inverter becomes great. Furthermore, to drive the inverter, the switching of a transistor of the inverter is performed, and therefore, a surge voltage, which is a transient voltage, momentarily occurs. The surge voltage increases with increases in the battery voltage. Therefore, the load on the inverter increases with increases in the battery voltage.

SUMMARY OF THE INVENTION

An electric vehicle drive control apparatus in accordance with the invention has an electric machine; a battery; an inverter that is driven in accordance with a drive signal, and that receives a direct current from the battery, and produces a phase current, and supplies the phase current to the electric machine; battery voltage detection means for detecting a battery voltage; and electric machine torque restriction processing means for determining whether the battery voltage is higher than a threshold value, and for restricting an electric machine torque if the battery voltage is higher than the threshold value.

Another electric vehicle drive control apparatus in accordance with the invention has an electric generator mechanically connected to an engine; a battery; an inverter that is driven in accordance with a drive signal, and that receives a direct current from the battery, and produces a phase current, and supplies the phase current to the electric generator; battery voltage detection means for detecting a battery voltage; and engine torque restriction processing means for determining whether the battery voltage is higher than a threshold value, and for restricting an engine torque if the battery voltage is higher than the threshold value.

Still another electric vehicle drive control apparatus in accordance with the invention further includes a planetary gear unit having at least first to third gear elements, wherein the first gear element is connected to the electric generator, and the third gear element is connected to the engine.

A further electric vehicle drive control apparatus in accordance with the invention further includes a drive motor mechanically connected to the engine and the electric generator.

An electric vehicle drive control method in accordance with the invention is applicable to an electric vehicle drive control apparatus that includes an electric machine; a battery; and an inverter that is driven in accordance with a drive signal, and that receives a direct current from the battery, and produces a phase current, and supplies the phase current to the electric machine.

In this method, a battery voltage is detected, and it is determined whether the battery voltage is higher than a threshold value. If the battery voltage is higher than the threshold value, an electric machine torque is restricted.

Another electric vehicle drive control method in accordance with the invention is applicable to an electric vehicle drive control apparatus that includes an electric generator mechanically connected to an engine; a battery; and an inverter that is driven in accordance with a drive signal, and that receives a direct current from the battery, and produces a phase current, and supplies the phase current to the electric generator.

In this method, a battery voltage is detected, and it is determined whether the battery voltage is higher than a threshold value. If the battery voltage is higher than the threshold value, an engine torque is restricted.

A program of an electric vehicle drive control apparatus in accordance with the invention causes a computer to function as battery voltage detection means for detecting a battery voltage; and electric machine torque restriction processing means for determining whether the battery voltage is higher than a threshold value, and for restricting an electric machine torque if the battery voltage is higher than the threshold value.

Another program of an electric vehicle drive control apparatus in accordance with the invention causes a computer to function as battery voltage detection means for detecting a battery voltage; and engine torque restriction processing means for determining whether the battery voltage is higher than a threshold value, and for restricting an engine torque if the battery voltage is higher than the threshold value.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
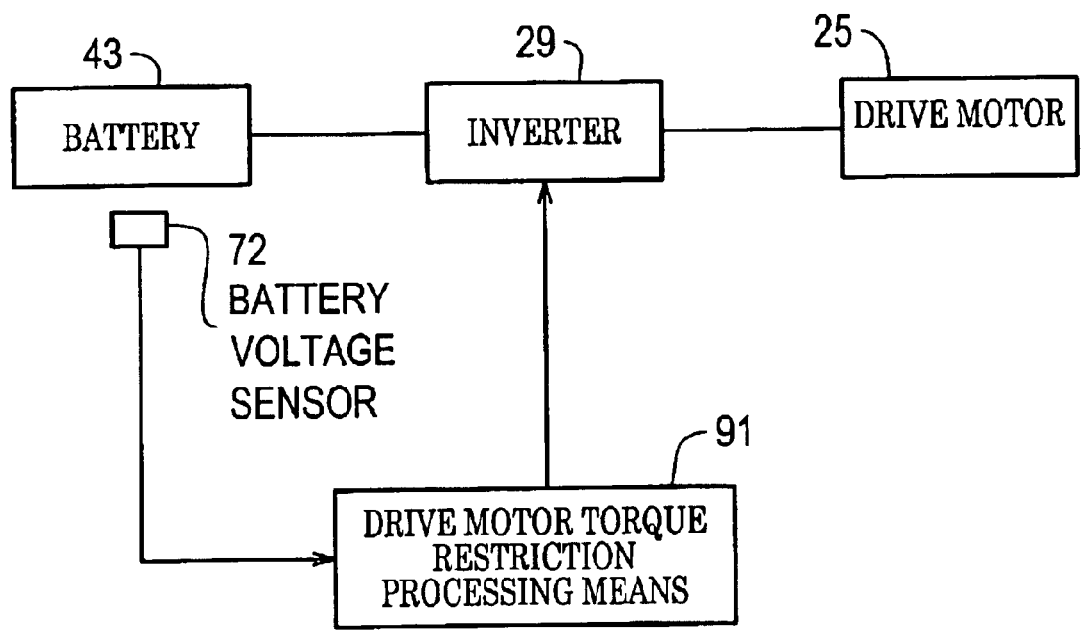
FIG. 1 is a functional block diagram of an electric vehicle drive control apparatus in a first embodiment of the invention.

Embodiments of the invention will be described in detail hereinafter with reference to the drawings. FIG. 1 is a functional block diagram of an electric vehicle drive control apparatus in a first embodiment of the invention.

Shown in FIG. 1 are a drive motor 25 as an electric machine; a battery 43; an inverter 29 that is driven in accordance with a drive signal, and that, upon receiving the DC current from the battery 43, produces phase currents, and supplies the phase currents to the drive motor 25; a battery voltage sensor 72 as a battery voltage detection means for detecting the battery voltage; and a drive motor torque restriction processing means 91 as an electric machine torque restriction processing means for determining whether the battery voltage is higher than a threshold value, and when the battery voltage is higher than the threshold value, restricting the torque of the drive motor 25, that is, the drive motor torque as an electric machine torque.

Next, a hybrid type vehicle, as an electric vehicle, will be described. As for the electric vehicle, the invention is also applicable to an electric vehicle that has neither an engine nor an electric generator, but has a drive motor alone, instead of the hybrid type vehicle.

Figure 2:
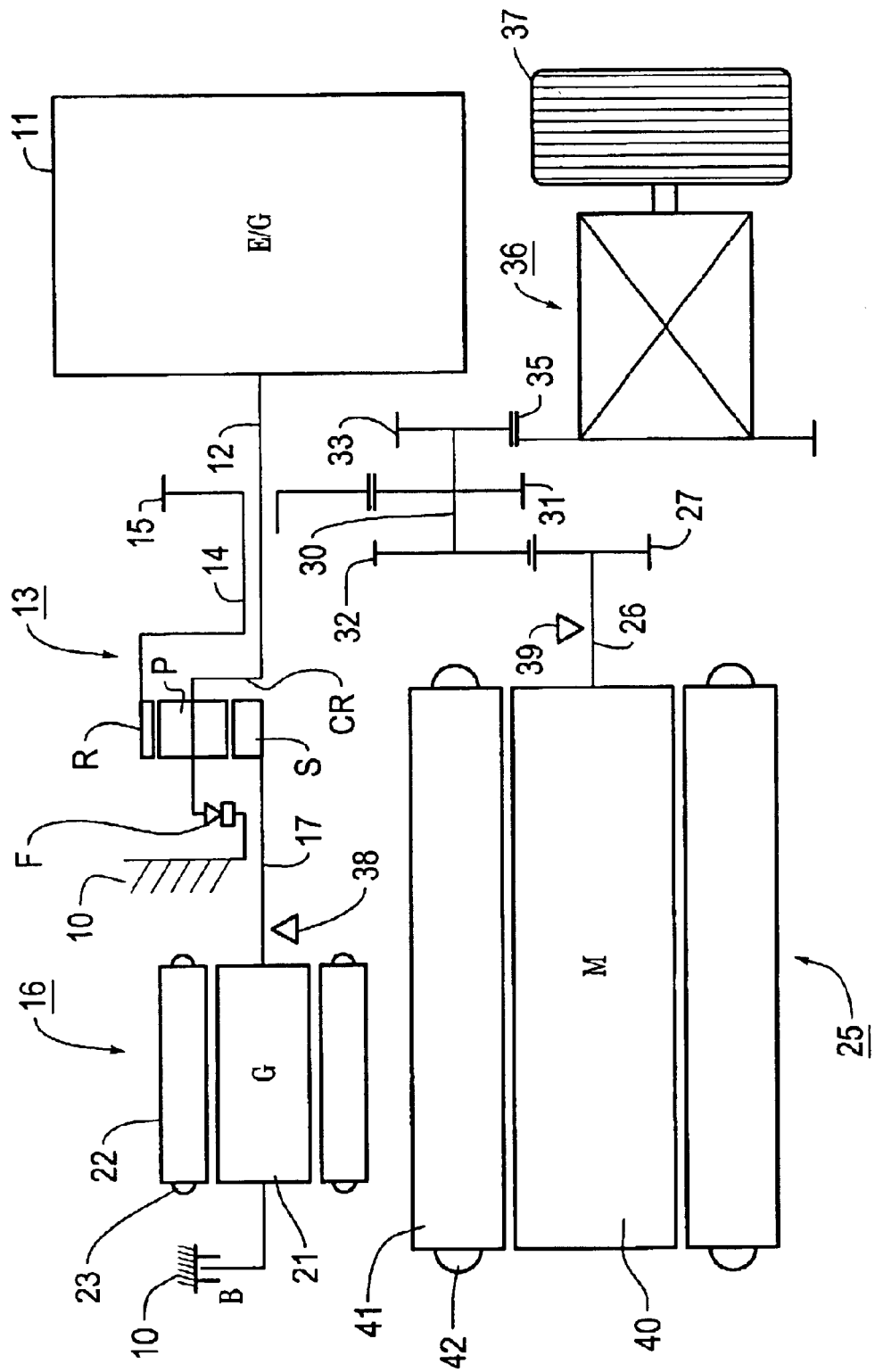
FIG. 2 is a conceptual diagram of a hybrid type vehicle in the first embodiment of the invention.

FIG. 2 is a conceptual diagram of a hybrid type vehicle in the first embodiment of the invention. Shown in FIG. 2 are an engine (E/G) 11 disposed on a first axis; an output shaft 12 that is disposed on the first axis and that outputs rotation provided by driving the engine 11; a planetary gear unit 13, as a differential gear device, that is disposed on the first axis and that changes the speed of rotation input via the output shaft 12; an output shaft 14 that is disposed on the first axis and that outputs speed-changed rotation from the planetary gear unit 13; a first counter drive gear 15 as an output gear fixed to the output shaft 14; and a generator (G) 16 that is disposed on the first axis, and is connected to the planetary gear unit 13 via a transfer shaft 17, and is mechanically connected to the engine 11 in a fashion allowing differential rotation.

The output shaft 14 has a sleeve-like shape, and is disposed surrounding, i.e., coaxial with, the output shaft 12. The first counter drive gear 15 is disposed at an engine 11 side of the planetary gear unit 13.

The planetary gear unit 13 has at least a sun gear S as a first gear element, pinions P meshing with the sun gear S, a ring gear R as a second gear element that meshes with the pinions P, and a carrier CR as a third gear element that rotatably supports the pinions P. The sun gear S is mechanically connected to the generator 16 via the transfer shaft 17. The ring gear R is mechanically connected, via the output shaft 14 and a predetermined gear train, to drive wheels 37 (one shown), and to a drive motor (M) 25 as a second electric motor which is disposed on a second axis parallel to the first axis, and which are mechanically connected to the engine 11 and the generator 16 in a fashion allowing differential rotation. The carrier CR is mechanically connected to the engine 11 via the output shaft 12. A one-way clutch F is disposed between the carrier CR and a case 10 of the electric vehicle drive apparatus. The one-way clutch F becomes free when forward rotation of the engine 11 is transferred to the carrier CR. When reverse rotation from the generator 16 or the drive motor 25 is transferred to the carrier CR, the one-way clutch F is locked so as to prevent transfer of the reverse rotation to the engine 11.

Furthermore, the generator 16 is made up of a rotor 21 that is fixed to the transfer shaft 17 and is rotatably disposed, a stator 22 disposed around the rotor 21, and coils 23 wound on the stator 22. The generator 16 generates electric power from rotation transferred thereto via the transfer shaft 17. The coils 23 are connected to the battery 43 (the battery 43 shown in FIG. 1), and supply DC current to the battery. A generator brake B is disposed between the rotor 21 and the case 10. By engaging the generator brake B, the rotor 21 can be fixed to mechanically stop rotation of the generator 16.

Reference numeral 26 represents an output shaft disposed on a second axis. Rotation of the drive motor 25 is output via the output shaft 26. Reference numeral 27 represents a second counter drive gear as an output gear fixed to the output shaft 26. The drive motor 25 is made up of a rotor 40 fixed to the output shaft 26 and rotatably disposed, a stator 41 provided around the rotor 40, and coils 42 wound on the stator 41.

The drive motor 25 generates drive motor torque TM from electric current supplied to the coils 42. Therefore, the coils 42 are connected to the battery. DC current from the battery is converted into AC current, which is supplied to the coils 42.

In order to rotate the drive wheels 37 in the same rotational direction as the engine 11, a counter shaft 30 is disposed on a third axis parallel to the first and second axes. A first counter driven gear 31, and a second counter driven gear 32, having more teeth than the first counter driven gear 31, are fixed to the counter shaft 30. The first counter driven gear 31 and the first counter drive gear 15 mesh with each other, and the second counter driven gear 32 and the second counter drive gear 27 mesh with each other. Therefore, rotation of the first counter drive gear 15 is reversed when transferred to the first counter driven gear 31, and rotation of the second counter drive gear 27 is reversed when transferred to the second counter driven gear 32. Furthermore, a differential pinion gear 33 having fewer teeth than the first counter driven gear 31 is fixed to the counter shaft 30.

A differential device 36 is disposed on a fourth axis parallel to the first to third axes. A differential ring gear 35 of the differential device 36 meshes with the differential pinion gear 33. Therefore, rotation transferred to the differential ring gear 35 is distributed and transferred to the drive wheels 37 by the differential device 36. Thus, rotation produced by the engine 11 can be transferred to the first counter driven gear 31. Furthermore, rotation produced by the drive motor 25 can be transferred to the second counter driven gear 32. Therefore, by driving the engine 11 and the drive motor 25, the hybrid type vehicle can be run.

Reference numeral 38 represents a generator rotor position sensor, such as a resolver or the like, for detecting the position of the rotor 21, that is, the generator rotor position $\theta G$. Reference numeral 39 represents a drive motor rotor position sensor, such as a resolver or the like, for detecting the position of the rotor 40, that is, the drive motor rotor position $\theta M$.

By computing a rate of change $\Delta\theta G$ of the generator rotor position $\theta G$, it is possible to compute the generator rotation speed NG. By computing a rate of change $\Delta\theta M$ of the drive motor rotor position $\theta M$, it is possible to compute the rotation speed of the drive motor 25, that is, the drive motor rotation speed NM. Furthermore, the vehicle speed V can be computed based on the rate of change $\Delta\theta M$ and the gear ratio $\gamma V$ of a torque transfer system from the output shaft 26 to the drive wheels 37. The generator rotor position $\theta G$ corresponds to the generator rotation speed NG, and the drive motor rotor position $\theta M$ corresponds to the drive motor rotation speed NM. Therefore, it is possible to cause the generator rotor position sensor 38 to function as a generator rotation speed detection means for detecting the generator rotation speed NG, and cause the drive motor rotor position sensor 39 to function as a drive motor rotation speed detection means for detecting the drive motor rotation speed NM and as a vehicle speed detection means for detecting the vehicle speed V.

Figure 3:
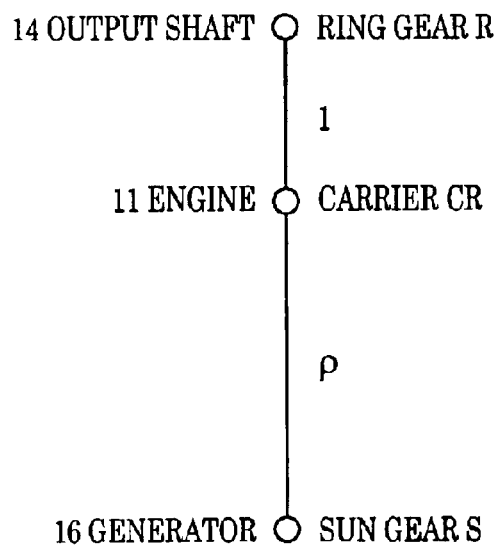
FIG. 3 is a diagram illustrating the operation of the planetary gear unit in accordance with the first embodiment of the invention.
Figure 4:
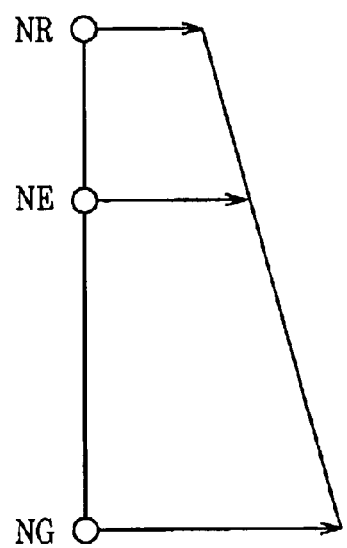
FIG. 4 is a vehicle speed diagram for a normal run in accordance with the first embodiment of the invention.
Figure 5:
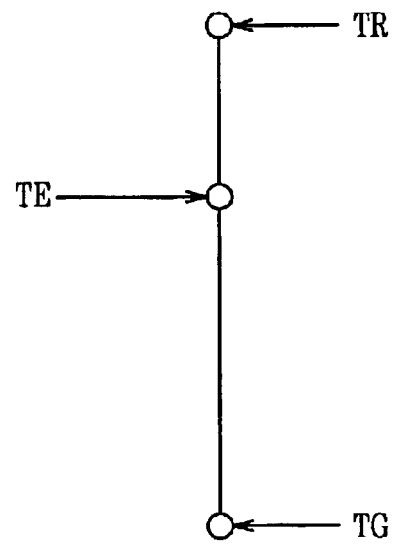
FIG. 5 is a torque diagram for a normal run in accordance with the first embodiment of the invention.

Next described will be operation of the planetary gear unit 13. FIG. 3 is a diagram illustrating the operation of the planetary gear unit in accordance with the first embodiment of the invention. FIG. 4 is a vehicle speed diagram for a normal run of the vehicle in accordance with the first embodiment of the invention. FIG. 5 is a torque diagram for a normal run in accordance with the first embodiment of the invention.

As shown in FIGS. 2 and 3, in the planetary gear unit 13 (FIG. 2), the carrier CR is connected to the engine 11, and the sun gear S is connected to the generator 16. Furthermore, the ring gear R is connected to the drive motor 25 and the drive wheels 37 via the output shaft 14. Therefore, the rotation speed of the ring gear R, that is, the ring gear rotation speed NR, equals the rotation speed output to the output shaft 14, that is, the output shaft rotation speed. The rotation speed of the carrier CR equals the rotation speed of the engine 11, that is, the engine rotation speed NE. The rotation speed of the sun gear S equals the generator rotation speed NG. Then, if the number of teeth of the ring gear R is set at $\rho$ times (two times in this embodiment) the number of teeth of the sun gear S, the following relationship holds:

$$(\rho+1)\cdot NE = 1\cdot NG + \rho\cdot NR.$$

Therefore, the engine rotation speed NE can be computed from the ring gear rotation speed NR and the generator rotation speed NG as follows:

$$NE = (1\cdot NG + \rho\cdot NR)/(\rho+1). \tag{1}$$

Equation (1) forms a rotation speed relational expression regarding the planetary gear unit 13.

The torque of the engine 11, that is, engine torque TE, and the torque produced on the ring gear R, that is, the ring gear torque TR, and the generator torque TG as electric machine torque have the following relationship:

$$TE:TR:TG = (\rho+1):\rho:1. \tag{2}$$

Thus, these torques are affected by reaction forces from one another.

During an ordinary run of the hybrid type vehicle, the ring gear R, the carrier CR and the sun gear S are rotated in a positive direction, and the ring gear rotation speed NR, the engine rotation speed NE and the generator rotation speed NG assume positive values as indicated in FIG. 4. The ring gear torque TR and the generator torque TG are acquired by splitting the engine torque TE at a torque ratio that is determined by the number of teeth of the planetary gear unit 13. Therefore, in the torque diagram of FIG. 5, the engine torque TE is the sum of the ring gear torque TR and the generator torque TG.

Figure 6:
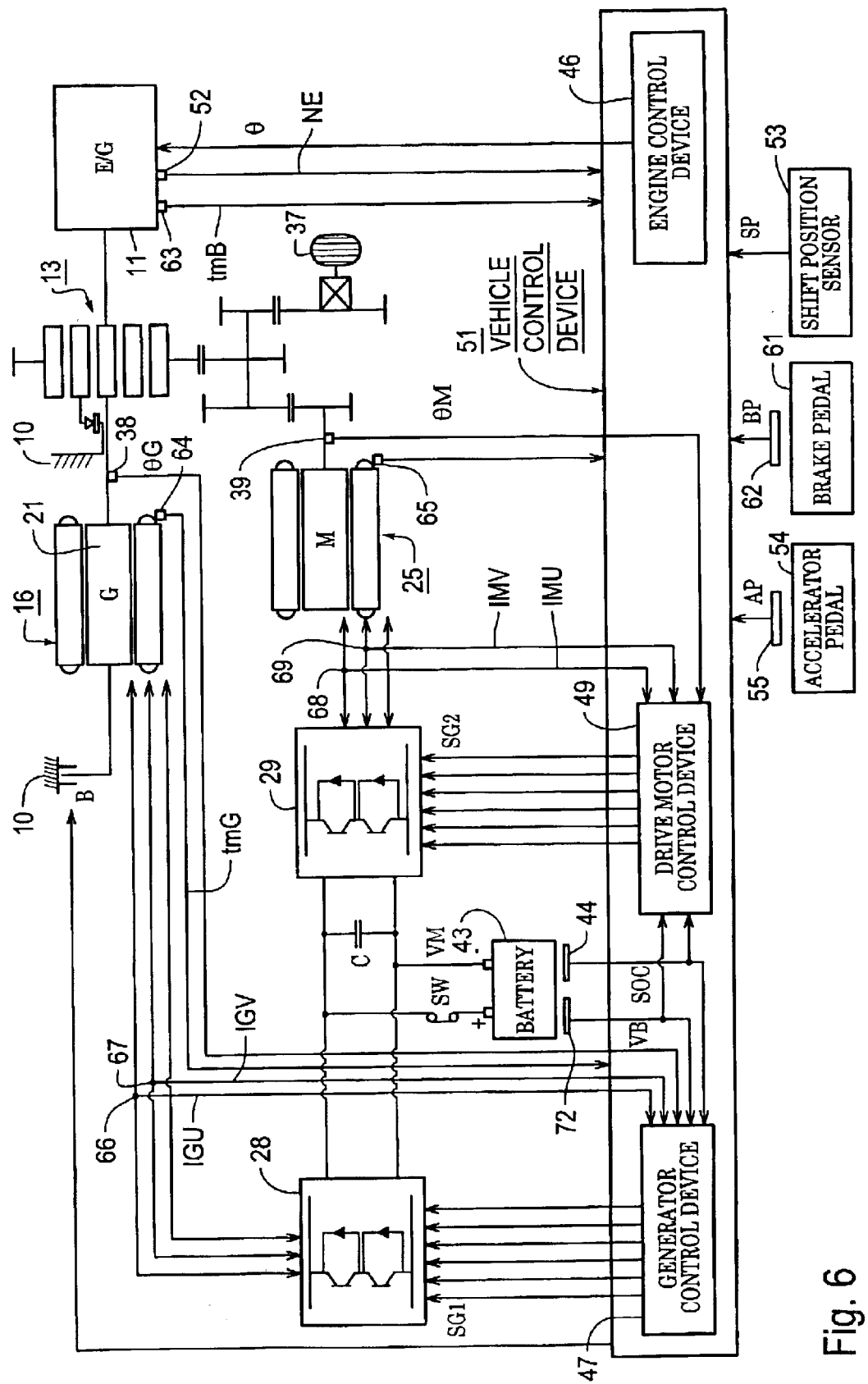
FIG. 6 is a conceptual diagram illustrating a hybrid type vehicle drive control apparatus in accordance with the first embodiment of the invention.

Next described will be a hybrid type vehicle drive control apparatus and a hybrid type vehicle drive control method for controlling the hybrid type vehicle drive apparatus. FIG. 6 is a conceptual diagram illustrating a hybrid type vehicle drive control apparatus in accordance with the first embodiment of the invention.

FIG. 6 shows a case 10, an engine 11 (E/G), a planetary gear unit 13, a generator (G) 16, a generator brake B for fixing a rotor 21 of the generator 16, a drive motor (M) 25, an inverter 28 for driving the generator 16, an inverter 29 for driving the drive motor 25, drive wheels 37 (one shown); a generator rotor position sensor 38, a drive motor rotor position sensor 39, and a battery 43. The inverters 28, 29 are connected to the battery 43 via a power supply switch SW. When the power supply switch SW is on, the battery 43 sends DC current to the inverters 28, 29. A smoothing capacitor C is connected between the battery 43 and the inverter 29.

A vehicle control device 51 is a computer that is made up of a CPU, a recording device, etc. (not shown), and that performs overall control of the hybrid type vehicle. The vehicle control device 51 includes an engine control device 46, a generator control device 47, and a drive motor control device 49. The engine control device 46 is made up of a CPU, a recording device, etc. (not shown), and sends instruction signals regarding the degree of throttle opening θ, the valve timing, etc., to the engine 11 in order to control the engine 11. The generator control device 47 is made up of a CPU, a recording device, etc. (not shown), and sends a drive signal SG1 to the inverter 28 in order to control the generator 16. The drive motor control device 49 is made up of a CPU, a recording device, etc. (not shown), and sends a drive signal SG2 to the inverter 29 in order to control the drive motor 25.

The inverter 28 is driven in accordance with the drive signal SG1. At the time of powering, the inverter 28 receives DC current from the battery 43, and generates phase currents, that is, currents IGU, IGV, IGW of a U-phase, a V-phase and a W-phase, and sends the currents IGU, IGV, IGW of the phases to the generator 16. At the time of regeneration, the inverter 28 receives the currents IGU, IGV, IGW, and generates DC currents, and sends the currents to the battery 43.

The inverter 29 is driven in accordance with the drive signal SG2. At the time of powering, the inverter 29 receives DC current from the battery 43, and generates currents IMU, IMV, MW of a U-phase, a V-phase and a W-phase, and sends the currents IMU, IMV, IMW of the phases to the drive motor 25. At the time of regeneration, the inverter 29 receives the currents IMU, IMV, IMW, and generates DC currents, and sends the currents to the battery 43.

Further shown are a battery remaining amount detecting device 44 that detects a battery remaining amount SOC as the state of the battery 43, that is, the battery state; an engine rotation speed sensor 52 that detects the engine rotation speed NE; a shift position sensor 53 as a speed selection operating means for detecting the position of a shift lever (not shown), that is, the shift position SP; an accelerator pedal 54; an accelerator switch 55 as an accelerator operation detection means for detecting the position (amount of depression) of the accelerator pedal 54, that is, the accelerator pedal position AP; a brake pedal 61; a brake switch 62 as a brake operation detection means for detecting the position (amount of depression) of the brake pedal 61, that is, the brake pedal position BP; an engine temperature sensor 63 as a first drive portion temperature detection means for detecting the temperature tmE of the engine 11; a generator temperature sensor 64 as a second drive portion temperature detection means for detecting the temperature of the generator 16, for example, the temperature tmG of the coils 23 (FIG. 2); and a drive motor temperature sensor 65 as a third drive portion temperature detection means for detecting the temperature of the drive motor 25, for example, the temperature tmM of the coils 42.

Still further, shown are current sensors 66 to 69 that detect the currents IGU, IGV, IMU, IMV, respectively, and a battery voltage sensor 72 as a battery voltage detection means for detecting the battery voltage VB as the battery state. As a battery state, it is possible to detect battery current, battery temperature, etc. Battery state detection means is formed by the battery remaining amount detecting device 44, the battery voltage sensor 72, a battery current sensor (not shown), a battery temperature sensor (not shown), etc.

The vehicle control device 51 sets the driving and stopping of the engine 11 by sending an engine control signal to the engine control device 46, and computes the generator rotation speed NG by reading the generator rotor position θG, computes the drive motor rotation speed NM by reading the drive motor rotor position θM, and computes the engine rotation speed NE using the rotation speed relational expression, and sets in the engine control device 46 a target engine rotation speed NE* that represents a target value of the engine rotation speed NE, sets in the generator control device 47 a target generator rotation speed NG* that represents a target value of the generator rotation speed NG, and a target generator torque TG* that represents a target value of the generator torque TG, and sets in the drive motor control device 49 a target drive motor torque TM* that represents a target value of the drive motor torque TM, and a drive motor torque corrected value δTM that represents a corrected value of the drive motor torque TM.

Therefore, a generator rotation speed computation processing means (not separately shown) of the vehicle control device 51 reads the generator rotor position θG, and computes the generator rotation speed NG. A drive motor rotation speed computation processing means (not separately shown) of the vehicle control device 51 reads the drive motor rotor position θM, and computes the drive motor rotation speed NM. A engine rotation speed computation processing means (not separately shown) of the vehicle control device 51 computes the engine rotation speed NE using the rotation speed relational expression. The generator rotation speed computation processing means, the drive motor rotation speed computation processing means, and the engine rotation speed computation processing means function as the generator rotation speed detection means, the drive motor rotation speed detection means, and the engine rotation speed detection means for detecting the generator rotation speed NG, the drive motor rotation speed NM, and the engine rotation speed NE.

Although in this embodiment, the engine rotation speed NE is computed by the vehicle control device 51, it is also possible to read the engine rotation speed NE from the engine rotation speed sensor 52. Furthermore, although in the embodiment, the vehicle speed V is computed from the drive motor rotor position θM, it is also possible to compute the vehicle speed V from the ring gear rotation speed NR, or compute the vehicle speed V from the rotation speed of the drive wheels 37, that is, the drive wheel rotation speed. In that case, a ring gear rotation speed sensor, a drive wheel rotation speed sensor, etc., may be provided as vehicle speed detection means.

Figure 7:
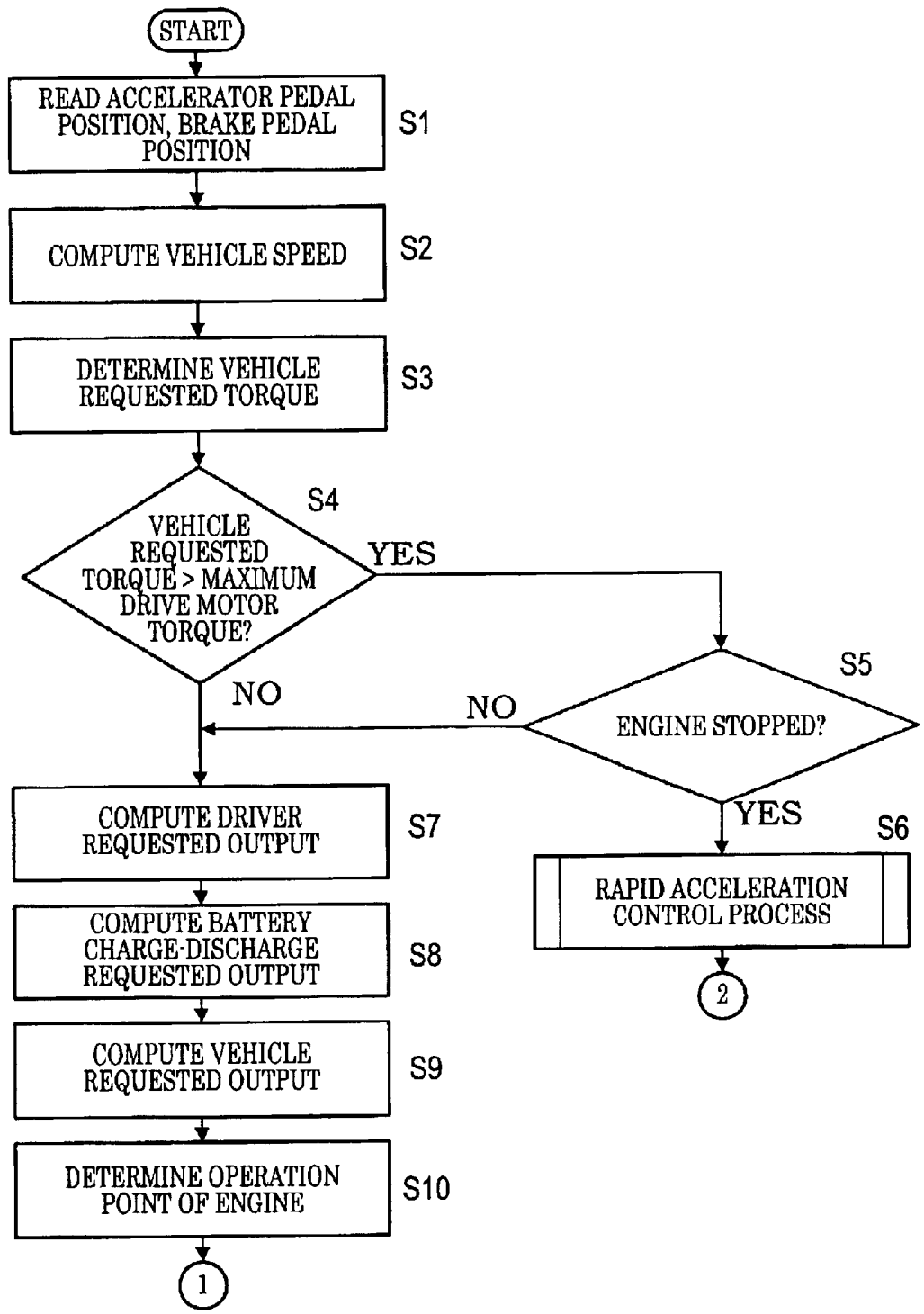
FIG. 7 is a first main flowchart illustrating an operation of a hybrid type vehicle drive control apparatus in the first embodiment of the invention.
Figure 8:
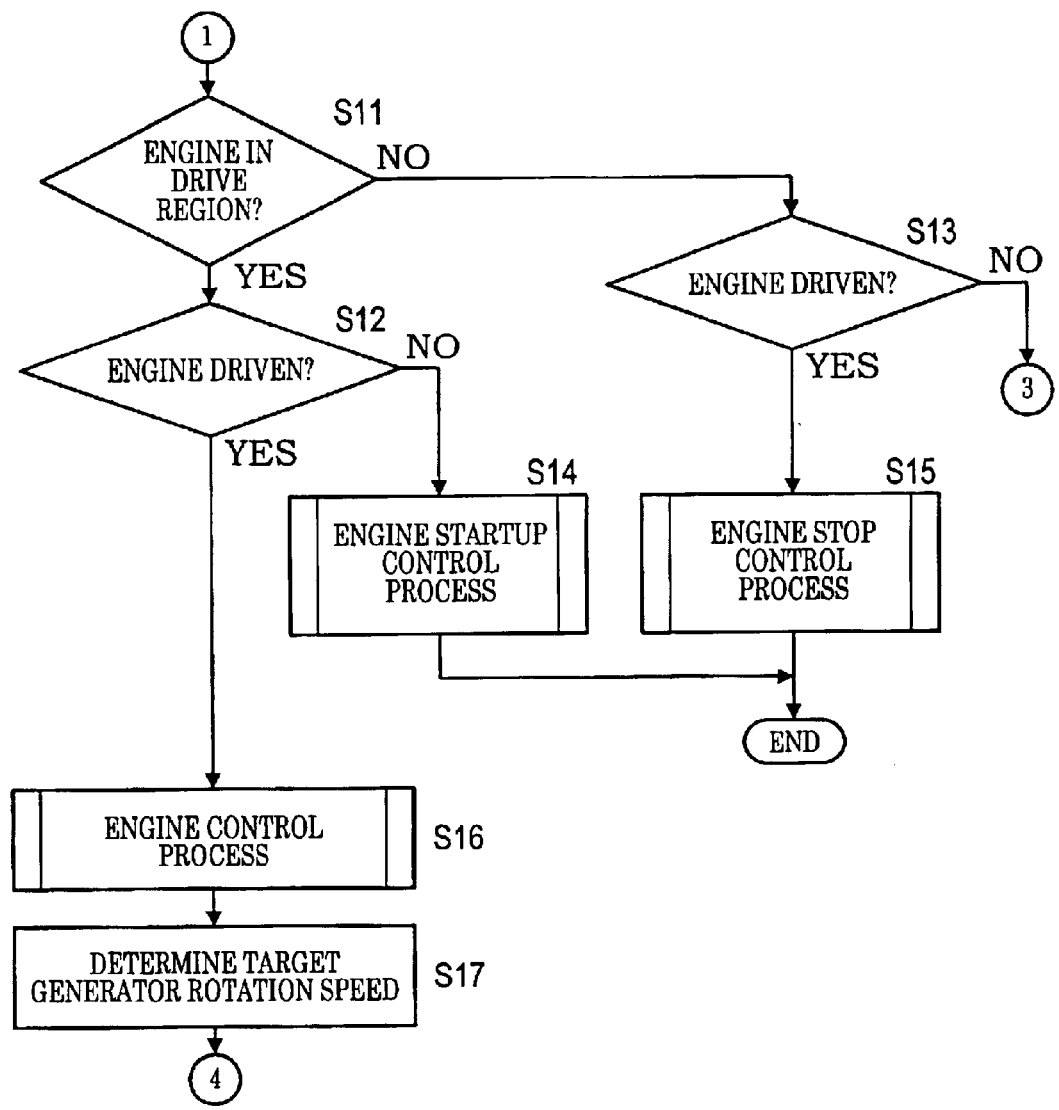
FIG. 8 is a second main flowchart illustrating an operation of the hybrid type vehicle drive control apparatus in the first embodiment of the invention.
Figure 9:
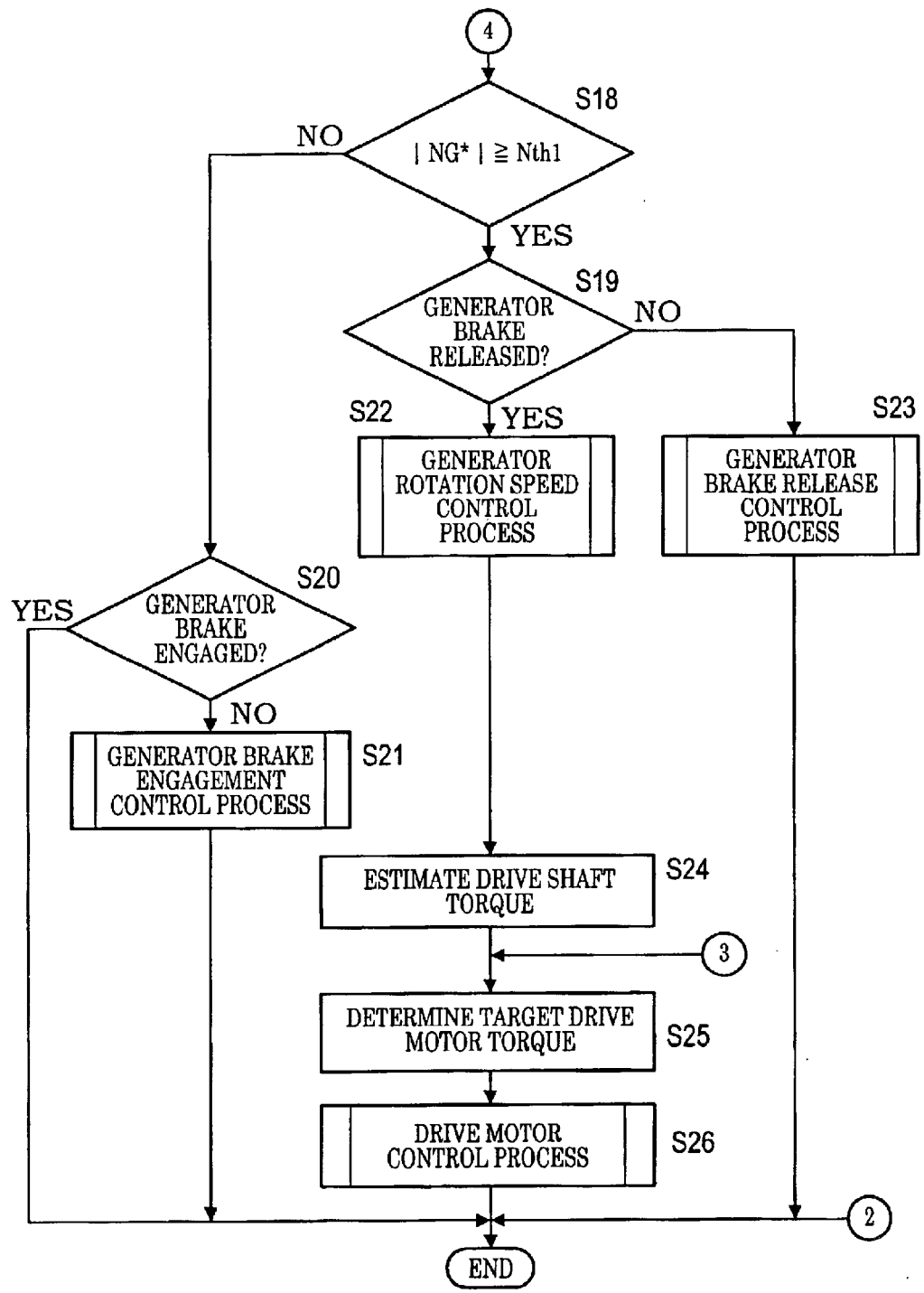
FIG. 9 is a third main flowchart illustrating an operation of the hybrid type vehicle drive control apparatus in the first embodiment of the invention.
Figure 10:
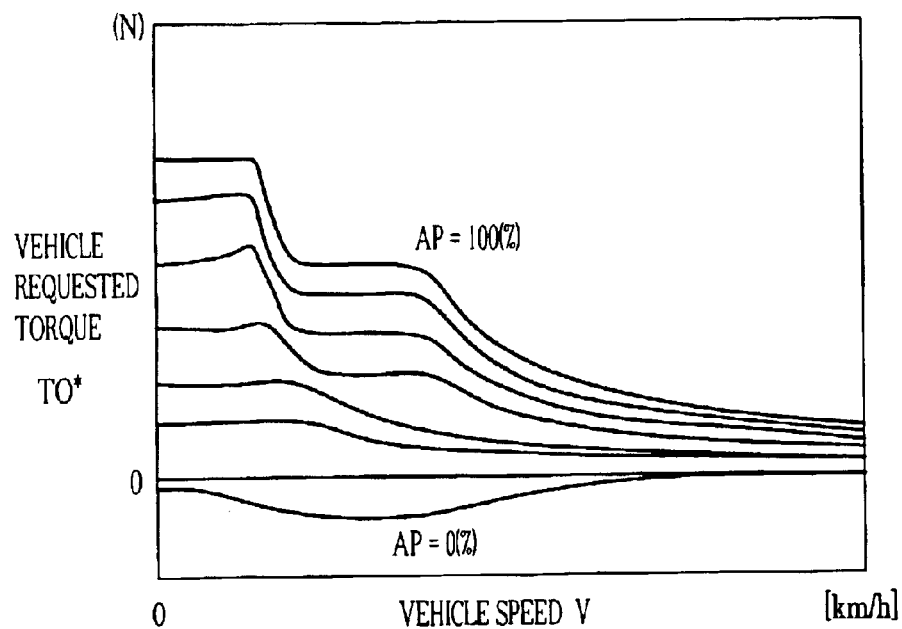
FIG. 10 is a diagram indicating a first vehicle-requested torque map in the first embodiment of the invention.
Figure 11:
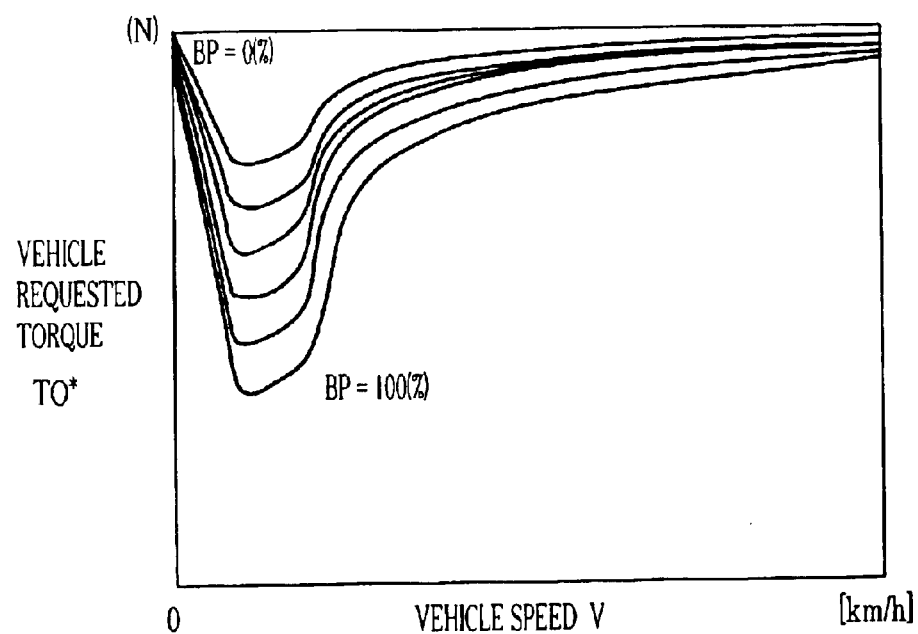
FIG. 11 is a diagram indicating a second vehicle-requested torque map in the first embodiment of the invention.
Figure 12:
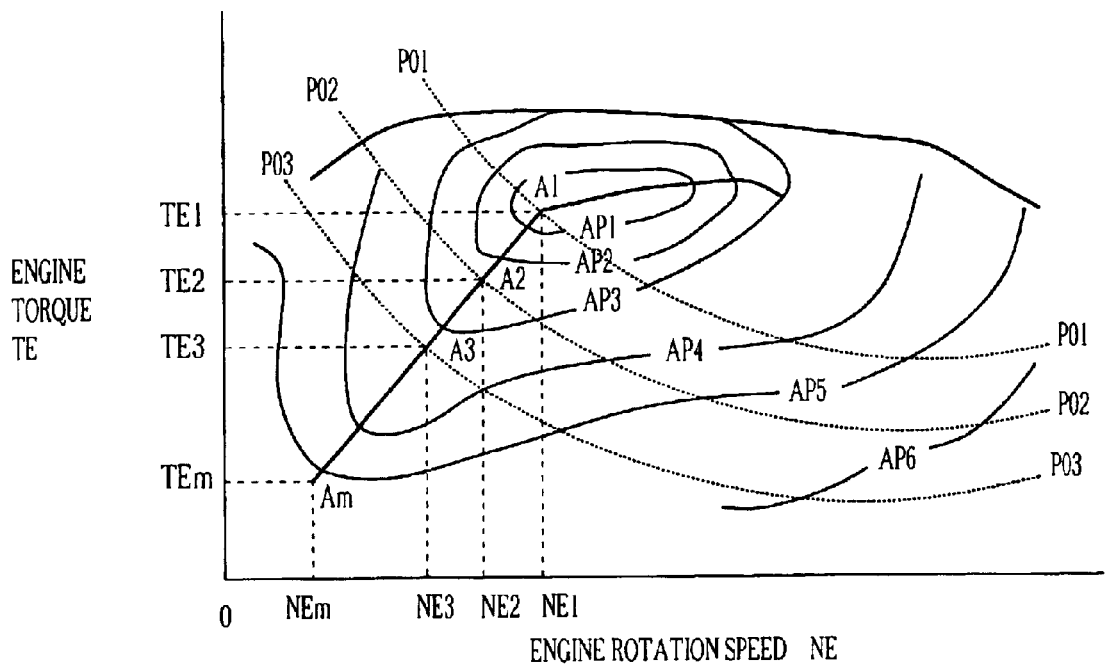
FIG. 12 is a diagram illustrating a target engine operation state map in the first embodiment of the invention.
Figure 13:
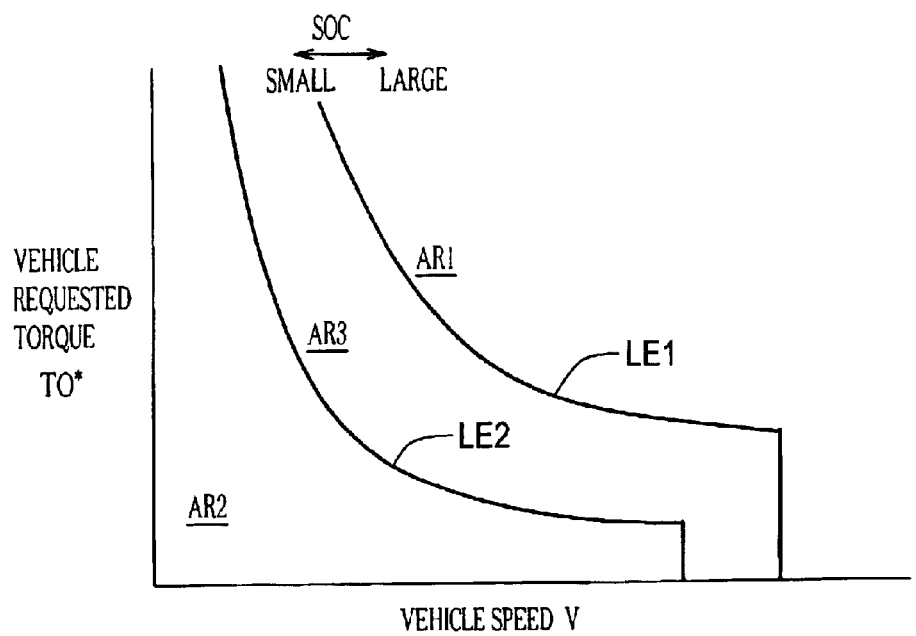
FIG. 13 is a diagram indicating an engine drive region map in the first embodiment of the invention.

Next to be described is the operation of the hybrid type vehicle drive control apparatus structured as described above. FIG. 7 is a first main flowchart illustrating an operation of a hybrid type vehicle drive control apparatus in the first embodiment of the invention. FIG. 8 is a second main flowchart illustrating an operation of the hybrid type vehicle drive control apparatus in the first embodiment of the invention. FIG. 9 is a third main flowchart illustrating an operation of the hybrid type vehicle drive control apparatus in the first embodiment of the invention. FIG. 10 is a diagram indicating a first vehicle-requested torque map in the first embodiment of the invention and FIG. 11 is a diagram indicating a second vehicle-requested torque map in the first embodiment of the invention. FIG. 12 is a diagram illustrating a target engine operation state map in the first embodiment of the invention and FIG. 13 is a diagram indicating an engine drive region map in the first embodiment of the invention. In FIGS. 10, 11 and 13, the horizontal axis indicates the vehicle speed V, and the vertical axis indicates the vehicle-requested torque TO*. In FIG. 12, the horizontal axis indicates the engine rotation speed NE, and the vertical axis indicates the engine torque TE.

First, a vehicle-requested torque determination processing means (not separately shown) of the vehicle control device 51 (FIG. 6) performs a vehicle-requested torque determining process. That is, the vehicle-requested torque determination processing means reads the accelerator pedal position AP from the accelerator switch 55, the brake pedal position BP from the brake switch 62, and the drive motor rotor position θM from the drive motor rotor position sensor 39, and computes the vehicle speed V. The means determines a vehicle-requested torque TO* needed to run the hybrid type vehicle which is pre-set corresponding to the accelerator pedal position AP, the brake pedal position BP and the vehicle speed V, by referring to the first vehicle-requested torque map of FIG. 10 recorded in a recording device of the vehicle control device 51 if the accelerator pedal 54 is depressed, and by referring to the second vehicle-requested torque map of FIG. 11 recorded in the recording device if the brake pedal 61 is depressed.

Subsequently, the vehicle control device 51 determines whether the vehicle-requested torque TO* is greater than a maximum drive motor torque TMmax that is pre-set as a rated torque of the drive motor 25. If the vehicle-requested torque TO* is greater than the maximum drive motor torque TMmax, the vehicle control device 51 determines whether the engine 11 is at a stop. If the engine 11 is at a stop, a rapid acceleration control processing means (not separately shown) of the vehicle control device 51 performs a rapid acceleration control process, in which the means drives the drive motor 25 and the generator 16 to run the hybrid type vehicle.

If the vehicle-requested torque TO* is not greater than the maximum drive motor torque TMmax, or if the vehicle-requested torque TO* is greater than the maximum drive motor torque TMmax and the engine 11 is in operation, a driver-requested output computation processing means (not separately shown) of the vehicle control device 51 performs a driver-requested output computing process, in which the vehicle-requested torque TO* is multiplied by the vehicle speed V to determine a driver-requested output PD:

$$PD=TO^* \cdot V.$$

Next, a battery charge-discharge requested output computation processing means (not separately shown) of the vehicle control device 51 performs a battery charge-discharge requested output computing process, in which the battery remaining amount SOC is read from the battery remaining amount detecting device 44, and a battery charge-discharge requested output PB is computed from the battery remaining amount SOC.

Subsequently, a vehicle-requested output computation processing means (not separately shown) of the vehicle control device 51 performs a vehicle-requested output computing process, in which the predetermined drive-requested output PD is added to the battery charge-discharge requested output PB to determine a vehicle-requested output PO:

$$PO=PD+PB.$$

Subsequently, a target engine operation state setting processing means (not separately shown) of the vehicle control device 51 performs a target engine operation state setting process. That is, referring to the target engine operation state map of FIG. 12, recorded in the recording device, the target engine operation state setting processing means determines points A1 to A3, Am of intersection of lines PO1 to PO3 indicating the vehicle-requested output PO with an optimal fuel economy curve L where the efficiency of the engine 11 becomes highest at each of the accelerator pedal positions AP1 to AP6, as operation points of the engine 11 indicating the target engine operation state. The engine torque TE1 to TE3, TEm at the operation point is determined as a target engine torque TE*. The engine rotation speed NE1 to NE3 at the operation point is determined as a target engine rotation speed NE*.

Then, the vehicle control device 51 determines whether the engine 11 is in a drive region AR1, by referring to the engine drive region map of FIG. 13 recorded in the recording device. In FIG. 13, AR1 represents a drive region in which the engine 11 is driven, and AR2 represents a stop region in which the driving of the engine 11 is stopped, and AR3 represents a hysteresis region. Furthermore, LE1 represents a line on which the engine 11 in a stopped state is driven, and LE2 represents a line on which the engine 11 in a driven state is stopped being driven. As the battery remaining amount SOC increases, the line LE1 is shifted rightward in FIG. 13 so as to reduce the driven region AR1. As the battery remaining amount SOC decreases, the line LE1 is shifted leftward in FIG. 13 so as to increase the drive region AR1.

If the engine 11 is not driven although the engine 11 is in the drive region AR1, a engine startup control processing means (not separately shown) of the vehicle control device 51 performs an engine startup control process to start the engine 11. If the engine 11 is driven although the engine 11 is not in the drive region AR1, a engine stop control processing means (not separately shown) of the vehicle control device 51 performs an engine stop control process to stop the driving of the engine 11. If the engine 11 is not in the drive region AR1 and the engine 11 is at a stop, a target drive motor torque computation processing means (not separately shown) of the vehicle control device 51 performs a target drive motor torque computation process, in which the vehicle-requested torque TO* is determined as a target drive motor torque TM*, and a drive motor control processing means (not separately shown) of the vehicle control device 51 performs a drive motor control process to perform a torque control of the drive motor 25.

If the engine 11 is in the drive region AR1 and the engine 11 is being driven, a engine control processing means (not separately shown) of the engine control device 46 performs an engine control process, in which the engine 11 is controlled by a predetermined method.

Next, the generator rotation speed computation processing means (not separately shown) of the vehicle control device 51 performs the generator rotation speed computation process, in which the drive motor rotor position θM is read, and a ring gear rotation speed NR is computed based on the drive motor rotor position θM and the gear ratio γR of a portion from the output shaft 26 to the ring gear R. The target engine rotation speed NE* determined in the target engine operation state setting process is read, and a target generator rotation speed NG* is computed and determined from the ring gear rotation speed NR and the target engine rotation speed NE* by using the rotation speed relational expression.

If the generator rotation speed NG is low during a run of the hybrid type vehicle in a motor-engine drive mode, the electric power consumption becomes great and the electric power generating efficiency of the generator 16 becomes low, so that the fuel economy of the hybrid type vehicle correspondingly deteriorates. Therefore, when the absolute value of the target generator rotation speed NG is less than a predetermined rotation speed, the generator brake B is engaged to mechanically stop the generator 16. Thus, the fuel economy will improve.

Therefore, the vehicle control device 51 determines whether the target generator rotation speed NG* is equal to or greater than a predetermined first rotation speed Nth1 (e.g., 500 [rpm]). If the absolute value of the target generator rotation speed NG* is equal to or greater than the first rotation speed Nth1, the vehicle control device 51 determines whether the generator brake B has been released. If the generator brake B has been released, a generator rotation speed control processing means (not separately shown) of the vehicle control device 51 performs a generator rotation speed control process to perform a torque control of the generator 16. If the generator brake B is not released, a generator brake release control processing means (not separately shown) of the vehicle control device 51 performs a generator brake release control process so as to release the generator brake B.

If in the generator rotation speed control process, a target generator torque TG* is determined and, on the basis of the target generator torque TG*, a torque control of the generator 16 is performed to generate a predetermined generator torque TG, the generator torque TG is converted into the ring gear torque TR, and is output from the ring gear R because the engine torque TE, the ring gear torque TR, and the generator torque TG are affected by reaction forces from one another as mentioned above.

As the ring gear torque TR is output from the ring gear R, the generator rotation speed NG fluctuates, and the ring gear torque TR fluctuates. The fluctuating ring gear torque TR is transferred to the drive wheels 37, so that the running feel of the hybrid type vehicle deteriorates. Therefore, the ring gear torque TR is computed, taking into account a torque corresponding to the inertia of the generator 16 (inertia of the rotor 21 and a not-shown rotor shaft) involved in the fluctuations of the generator rotation speed NG.

Therefore, a ring gear torque computation processing means (not separately shown) of the vehicle control device 51 performs a ring gear torque computation process, in which the target generator torque TG* determined in the generator rotation speed control process is read, and a ring gear torque TR is computed based on the target generator torque TG*, and the ratio of the number of teeth of the ring gear R to the number of teeth of the sun gear S.

That is, where the inertia of the generator 16 is expressed as InG and the angular acceleration (rotation change rate) of the generator 16 is expressed as αG, the sun gear torque TS applied to the sun gear S can be determined by adding a torque equivalent component (inertia torque) TGI corresponding to the inertia InG:

$$TGI = InG \cdot \alpha G$$

to the target generator torque TG* as in:

$$TS = TG* + TGI \quad (3)$$
$$= TG* + InG \cdot \alpha G.$$

Normally, the value assumed by the torque equivalent component TGI during acceleration of the hybrid type vehicle is negative with respect to the accelerating direction. The value of the torque equivalent component TGI during deceleration is positive. Furthermore, the angular acceleration αG is computed by differentiating the generator rotation speed NG.

If the number of teeth of the ring gear R is ρ times the number of teeth of the sun gear S, the ring gear torque TR is ρ times the sun gear torque TS, and therefore TR is expressed as:

$$TR = \rho \cdot TS \quad (4)$$
$$= \rho \cdot (TG* + TGI)$$
$$= \rho \cdot (TG* + InG \cdot \alpha G).$$

In this manner, the ring gear torque TR can be computed from the target generator torque TG* and the torque equivalent component TGI.

Therefore, a drive shaft torque estimation processing means (not separately shown) of the vehicle control device 51 performs a drive shaft torque estimation process, in which the torque of the output shaft 26 of the drive motor 25, that is, the drive shaft torque TR/OUT, is estimated based on the target generator torque TG*, and the torque equivalent component TGI corresponding to the inertia InG. Therefore, the drive shaft torque estimation processing means computes the drive shaft torque TR/OUT based on the ring gear torque TR, and the ratio of the number of teeth of the second counter drive gear 27 to the number of teeth of the ring gear R.

If the generator brake B is engaged, the target generator torque TG* is set at zero (0), and therefore the ring gear torque TR has a proportional relationship with the engine torque TE. Therefore, the drive shaft torque estimation processing means reads the engine torque TE from the engine control device 46, and computes a ring gear torque TR from the engine torque TE using the aforementioned torque relational expression, and then estimates the drive shaft torque TR/OUT based on the ring gear torque TR, and the ratio of the number of teeth of the second counter drive gear 27 to the number of teeth of the ring gear R.

Subsequently, a target drive motor torque determination processing means (not separately shown) of the vehicle control device 51 performs a target drive motor torque determination process, in which a surplus or shortfall of the drive shaft TR/OUT is determined as a target drive motor torque TM* by subtracting the drive shaft TR/OUT from the vehicle requested torque TO*.

Then, a drive motor control processing means (not separately shown) of the vehicle control device 51 performs a drive motor control process, in which a torque control of the drive motor 25 is performed based on an estimated drive shaft TR/OUT, so as to control the drive motor torque TM.

If the absolute value of the target generator rotation speed NG* is smaller than the first rotation speed Nth1, the vehicle control device 51 determines whether the generator brake B is engaged. If the generator brake B is engaged, the vehicle control device 51 ends the process. If the generator brake B is not engaged, a generator brake engagement control processing means (not separately shown) of the vehicle control device 51 performs a generator brake engagement control process to engage the generator brake B.

Next described will be the flowcharts of FIGS. 7–9.

Step S1: An accelerator pedal position AP and a brake pedal position BP are read.

Step S2: A vehicle speed V is computed.

Step S3: A vehicle requested torque TO* is determined.

Step S4: It is determined whether the vehicle requested torque TO* is greater than the maximum drive motor torque TMmax. If the vehicle requested torque TO* is greater than the maximum drive motor torque TMmax, the process proceeds to step S5. If the vehicle requested torque TO* is not greater than the maximum drive motor torque TMmax, the process proceeds to step S7.

Step S5: It is determined whether the engine 11 is stopped. If the engine 11 is stopped, the process proceeds to step S6. If the engine 11 is not stopped, i.e., is being driven, the process proceeds to step S7.

Figure 14:
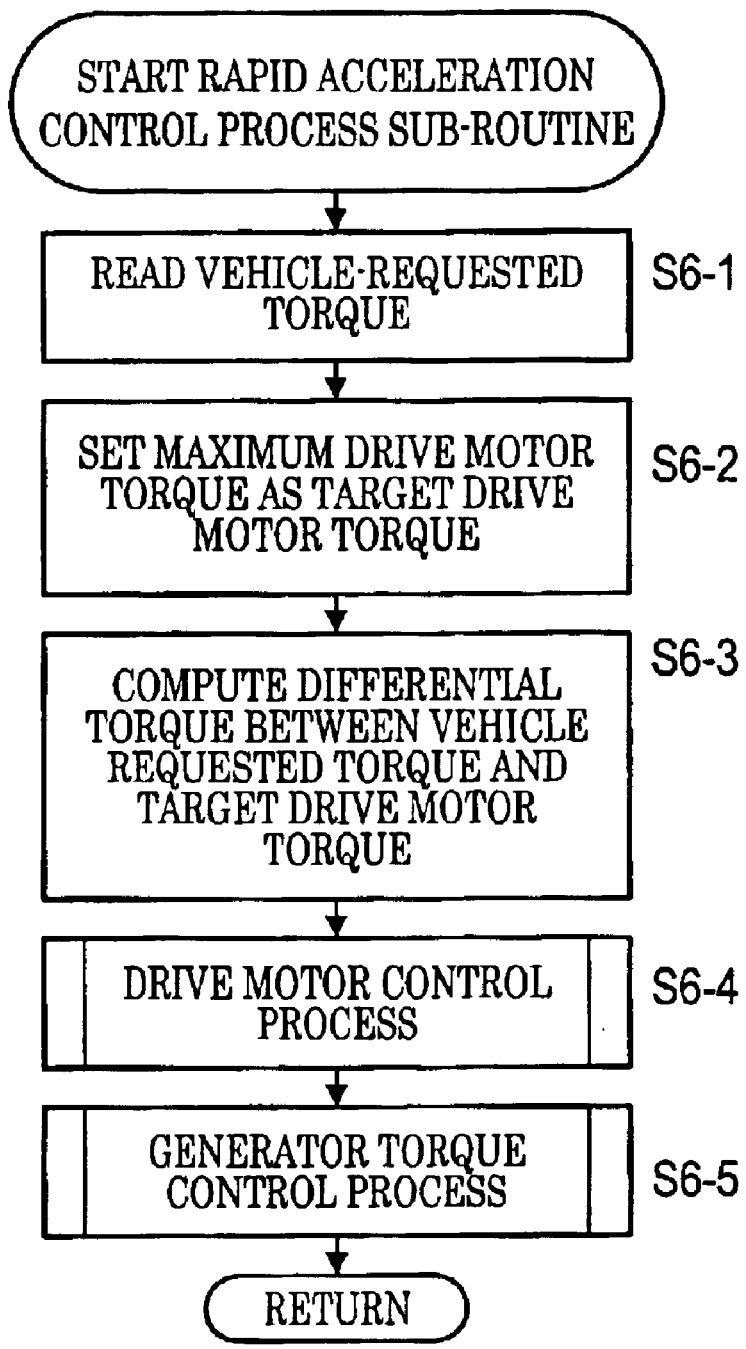
FIG. 14 is a chart illustrating the sub-routine of the rapid acceleration control process in the first embodiment of the invention.

Step S6: A rapid acceleration control process is performed (FIG. 14 to be described later). After that, the process ends.

Step S7: A driver requested output PD is computed.

Step S8: A battery charge-discharge requested output PB is computed.

Step S9: A vehicle-requested output PO is computed.

Step S10: An operation point of the engine 11 is determined.

Step S11 (FIG. 8): It is determined whether the engine 11 is in the drive region AR1. If the engine 11 is in the drive region ARI, the process proceeds to step S12. If the engine 11 is not in the drive region AR1, the process proceeds to step S13.

Step S12: It is determined whether the engine 11 is being driven. If the engine 11 is being driven, the process proceeds to step S16. If the engine 11 is not being driven, the process proceeds to step S14.

Step S13: It is determined whether the engine 11 is being driven. If the engine 11 is being driven, the process proceeds to step S15. If the engine 11 is not being driven, the process proceeds to step S25 (FIG. 9).

Step S14: An engine startup control process is performed. After that, the process ends.

Step S15: An engine stop control process is performed. After that, the process ends.

Step S16: An engine control process is performed.

Step S17: A target generator rotation speed NG* is determined.

Step S18 (FIG. 9): It is determined whether the absolute value of the target generator rotation speed NG* is equal to or greater than first rotation speed Nth1. If the absolute value of the target generator rotation speed NG* is equal to or greater than the first rotation speed Nth1, the process proceeds to step S19. If the absolute value of the target generator rotation speed NG* is less than the first rotation speed Nth1, the process proceeds to step S20.

Step S19: It is determined whether the generator brake B has been released. If the generator brake B has been released, the process proceeds to step S22. If the generator brake B has not been released, the process proceeds to step S23.

Step S20: It is determined whether the generator brake B has been engaged. If the generator brake B has been engaged, the process ends. If the generator brake B has not been engaged, the process proceeds to step S21.

Step S21: A generator brake engagement control process is performed. After that, the process ends.

Step S22: A generator rotation speed control process is performed.

Step S23: A generator brake release control process is performed. After that, the process ends.

Step S24: A drive shaft TR/OUT is estimated.

Step S25: A target drive motor torque TM* is determined.

Step S26: A drive motor control process is performed. After that, the process ends.

Next described will be the sub-routine of the rapid acceleration control process of step S6 in FIG. 7. FIG. 14 is a chart illustrating the sub-routine of the rapid acceleration control process in the first embodiment of the invention.

First, the rapid acceleration control processing means reads the vehicle-requested torque TO*, and sets the maximum drive motor torque TMmax as a target drive motor torque TM*. Subsequently, a target generator torque computation processing means of the rapid acceleration control processing means performs a target generator torque computation process, in which a differential torque ΔT between the vehicle-requested torque TO* and the target drive motor torque TM* is computed, and a shortfall of the maximum drive motor torque TMmax, which is the target drive motor torque TM*, is computed and determined as a target generator torque TG*.

Then, the drive motor control processing means of the rapid acceleration control processing means performs a drive motor control process, in which the torque control of the drive motor 25 (FIG. 6) is performed based on the target drive motor torque TM*. The generator torque control means of the rapid acceleration control processing means performs the generator torque control process, in which a torque control of the generator 16 is performed based on the generator torque TG.

Next, the flowchart of FIG. 14 will be described.

Step S6-1: The vehicle-requested torque TO* is read.

Step S6-2: The maximum drive motor torque TMmax is set as a target drive motor torque TM*.

Step S6-3: The differential torque AT between the vehicle-requested torque TO* and the target drive motor torque TM* is computed.

Step S6-4: The drive motor control process is performed.

Step S6-5: The generator torque control process is performed. The process then returns to S6 of FIG. 7.

Next described will be a sub-routine of the drive motor control process of step S26 of FIG. 9 and Step S6-4 of FIG. 14.

Figure 15:
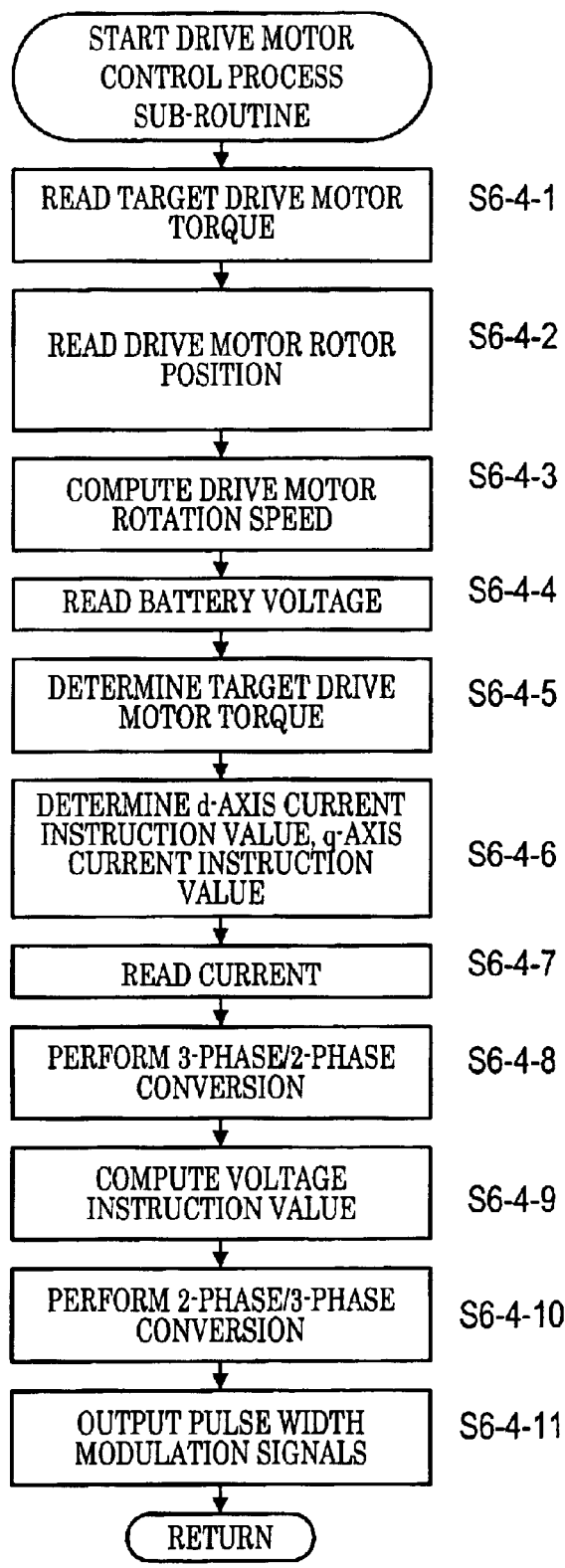
FIG. 15 is a chart illustrating the sub-routine of the drive motor control process in the first embodiment of the invention.
Figure 16:
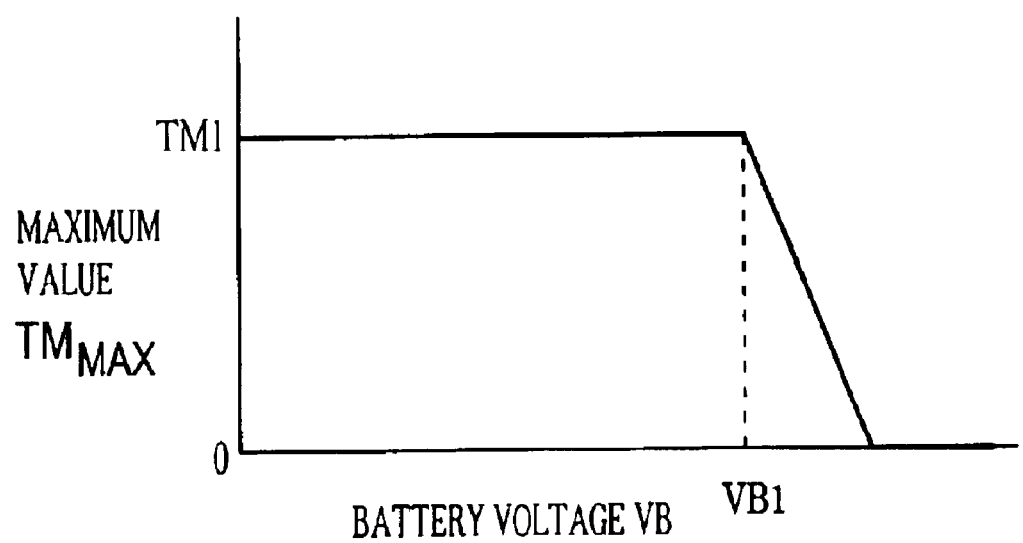
FIG. 16 is a diagram indicating a drive motor torque restriction map in the first embodiment of the invention.

FIG. 15 is a flowchart illustrating the sub-routine of the drive motor control process in the first embodiment of the invention. FIG. 16 is a diagram indicating a drive motor torque restriction map for the first embodiment of the invention. In FIG. 16, the horizontal axis indicates the battery voltage VB, and the vertical axis indicates the maximum drive motor torque TMmax.

First, the drive motor control processing means reads the target drive motor torque TM*, and reads the drive motor rotor position θM. From the drive motor rotor position θM, the drive motor control processing means computes a drive motor rotation speed NM. Subsequently, the means reads the battery voltage VB.

The drive motor torque restriction processing means 91 (FIG. 1), as an electric machine torque restriction processing means of the drive motor control processing means, performs a drive motor restriction process, thereby restricting the drive motor torque TM in correspondence to the battery voltage VB. Therefore, the drive motor torque restriction processing means 91 computes the maximum drive motor torque TMmax of the drive motor torque TM corresponding to the battery voltage VB, by referring to the drive motor torque restriction map of FIG. 16 recorded in the recording device of the vehicle control device 51 (FIG. 6), and restricts the drive motor torque TM using the maximum drive motor torque TMmax. In the drive motor torque restriction map, if the battery voltage VB is equal to or less than a predetermined threshold value VB1, the maximum drive motor torque TMmax assumes a predetermined value TM1. If the battery voltage VB is higher than the threshold value VB1, the maximum value TMmax decreases with increases in the battery voltage VB. Therefore, if the drive motor 25 is driven at the maximum value TMmax, the target drive motor torque TM* is reduced with decreases in the maximum value TMmax. Then, the drive motor torque restriction processing means 91 determines the restricted drive motor torque TM as a target drive motor torque TM*.

Next, the drive motor control processing means determines a d-axis current instruction value IMd* and a q-axis current instruction value IMq* based on the target drive motor torque TM*, the drive motor rotation speed NM and the battery voltage VB, with reference to a current instruction value map (not shown) for the drive motor control recorded in the recording device.

Furthermore, the drive motor control processing means reads the electric currents IMU, IMV from the electric current sensors 68 (FIG. 6), 69. From the currents IMU, IMV, the means computes a current IMW:

*IMW=IMU−IMV.*

The current IMW may also be detected by an electric current sensor, as is the case with the currents IMU, IMV.

Subsequently, the drive motor control processing means performs 3-phase/2-phase conversion of converting the currents IMU, IMV, IMW into a d-axis current IMd and a q-axis current IMq. From the d-axis current IMd, the q-axis current IMq, the d-axis current instruction value IMd* and the q-axis current instruction value IMq*, the means computes voltage instruction values VMd*, VMq*. Then, the drive motor control processing means performs 2-phase/3-phase conversion of converting the voltage instruction values VMd*, VMq* into voltage instruction values VMU*, VMV*, VMW*. From the voltage instruction values VMU*, VMV*, VMW*, the means computes pulse width modulation signals SU, SV, SW. Then, the means outputs the pulse width modulation signals SU, SV, SW to a drive processing means of the drive motor control processing means. The drive processing means performs a drive process, and sends a drive signal SG2 to the inverter 29 based on the pulse width modulation signals SU, SV, SW.

Thus, if the battery voltage VB becomes higher than the threshold value VB1, the drive motor torque TM is restricted. Therefore, increases in the load applied to the inverter 29 can be prevented. Furthermore, with regard to the driving of the inverter 29, if the switching of a transistor of the inverter 29 is performed, and therefore, a surge voltage which is a transient voltage transiently occurs so that the battery voltage VB becomes high, the load applied to the inverter 29 does not increase.

Next, the flowchart of FIG. 15 will be described. Because the same process is performed in step S6-4 and step S26, the process will be described in the context of step S6-4.

Step S6-4-1: The target drive motor torque TM* is read.
Step S6-4-2: The drive motor rotor position θM is read.
Step S6-4-3: The drive motor rotation speed NM is computed.
Step S6-4-4: The battery voltage VB is read.
Step S6-4-5: The target drive motor torque TM* is determined.
Step S6-4-6: The d-axis current instruction value IMd* and the q-axis current instruction value IMq* are determined.
Step S6-4-7: The currents IMU, IMV are read.
Step S6-4-8: The 3-phase/2-phase conversion is performed.
Step S6-4-9: The voltage instruction values VMd*, VMq* are computed.
Step S6-4-10: The 2-phase/3-phase conversion is performed.
Step S6-4-11: The pulse width modulation signals SU, SV, SW are output.
Then, the process returns to the appropriate step S6-4 or S26.

Figure 17:
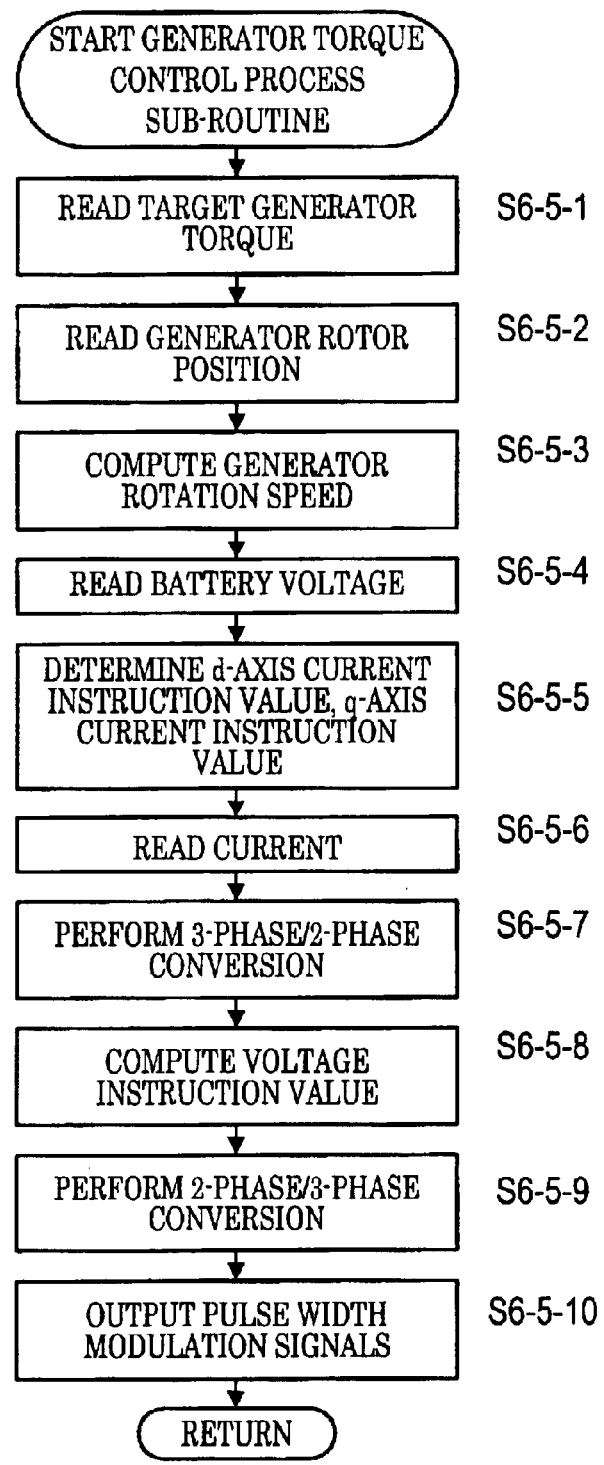
FIG. 17 is a chart illustrating the sub-routine of the generator torque control process in the first embodiment of the invention.

Next described will be a sub-routine of the generator torque control process of step S6-5 in FIG. 14. FIG. 17 illustrates the sub-routine.

First, the generator torque control processing means reads the target generator torque TG*, and reads the generator rotor position θG. From the generator rotor position θG, the means computes a generator rotation speed NG. Subsequently, the means reads the battery voltage VB. Next, the generator torque control processing means determines a d-axis current instruction value IGd* and a q-axis current instruction value IGq* based on the target generator torque TG*, the generator rotation speed NG and the battery voltage VB, with reference to a current instruction value map for generator control (not-shown) recorded in the recording device.

Then, the generator torque control processing means reads the currents IGU, IGV from the electric current sensors 66 (FIG. 6), 67. From the currents IGU, IGV, the means computes a current IGW:

*IGW=IGU−IGV.*

The current IGW may also be detected by an electric current sensor as in the case of the currents IGU, IGV.

Subsequently, the generator torque control processing means performs 3-phase/2-phase conversion of converting the currents IGU, IGV, IGW into a d-axis current IGd and a q-axis current IGq. From the d-axis current IGd, the q-axis current IGq, the d-axis current instruction value IGd* and the q-axis current instruction value IGq*, the means computes voltage instruction values VGd*, VGq*. Then, the drive motor control processing means performs 2-phase/3-phase conversion of converting the voltage instruction values VGd*, VGq* into voltage instruction values VGU*, VGV*, VGW*. From the voltage instruction values VGU*, VGV*, VGW*, the means computes pulse width modulation signals SU, SV, SW. Then, the means outputs the pulse width modulation signals SU, SV, SW to a drive processing means of the generator torque control processing means. The drive processing means performs a drive process, and sends a drive signal SG1 to the inverter 28 based on the pulse width modulation signals SU, SV, SW.

Next, the flowchart of FIG. 17 will be described.
Step S6-5-1: The target generator torque TG* is read.
Step S6-5-2: The generator rotor position θG is read.
Step S6-5-3: The generator rotation speed NG is computed.
Step S6-5-4: The battery voltage VB is read.
Step S6-5-5: The d-axis current instruction value IGd* and the q-axis current instruction value IGq* are determined.
Step S6-5-6: The currents IGU, IGV are read.
Step S6-5-7: The 3-phase/2-phase conversion is performed.
Step S6-5-8: The voltage instruction values VGd*, VGq* are computed.
Step S6-5-9: The 2-phase/3-phase conversion is performed.
Step S6-5-10: The pulse width modulation signals SU, SV, SW are output.
Then, the process returns to step S6-5.

Figure 18:
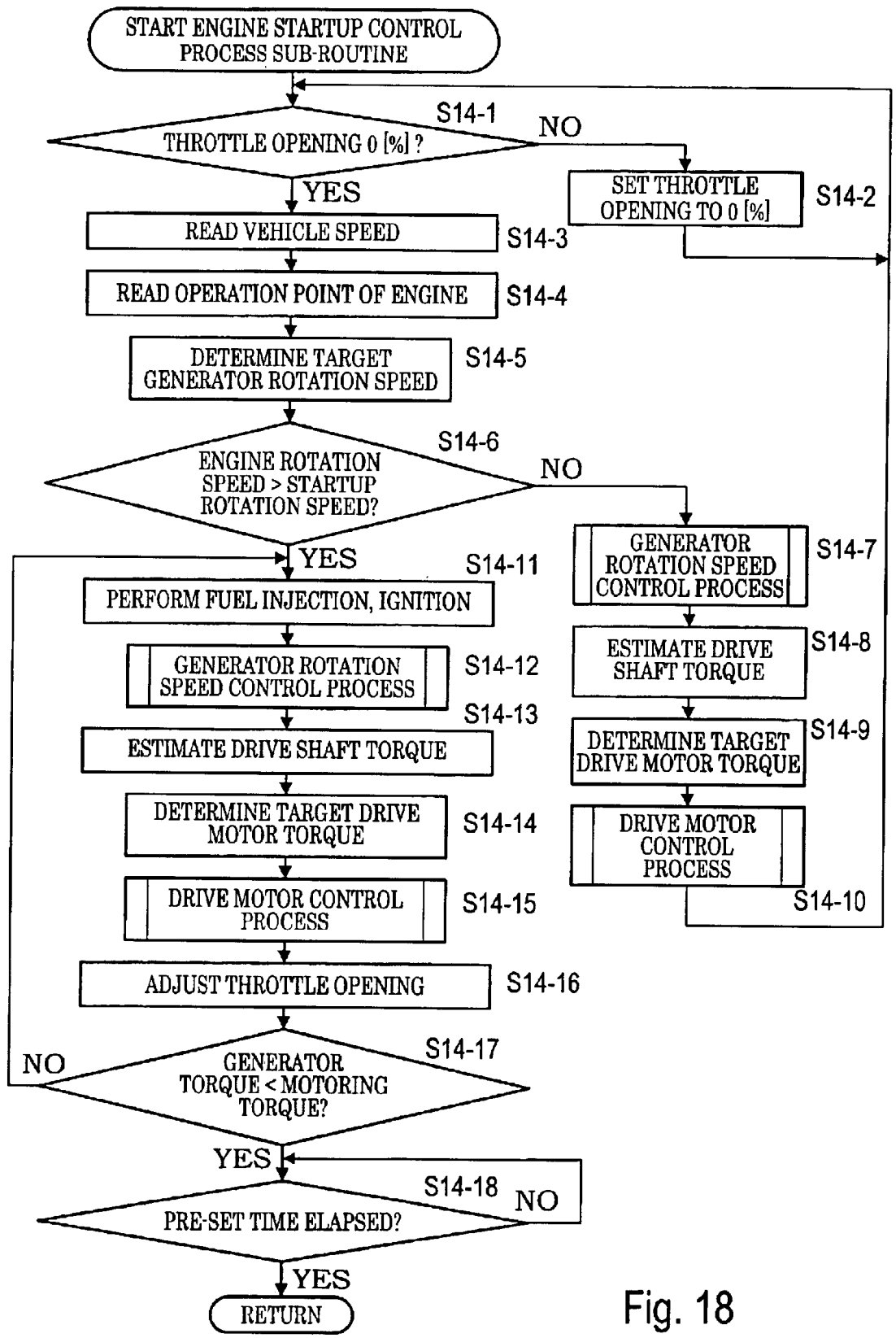
FIG. 18 is a chart illustrating the sub-routine of the engine startup control process in the first embodiment of the invention.

Next to be described is the sub-routine of the engine startup control process of step S14 in FIG. 8. FIG. 18 illustrates the sub-routine.

First, the engine startup control processing means reads the degree of throttle opening θ. If the degree of throttle opening θ is 0 [%], the means reads the vehicle speed V, and reads the operation point of the engine 11 (FIG. 2) determined in the target engine operation state setting process. The vehicle speed V is computed based on the drive motor rotor position θM as described above.

Subsequently, the engine startup control processing means reads the drive motor rotor position θM. The means computes a ring gear rotation speed NR based on the drive motor rotor position θM and the gear ratio γR, and reads the target engine rotation speed NE* at the aforementioned operation point. The engine startup control processing means then computes and determines a target generator rotation speed NG* based on the ring gear rotation speed NR and the target engine rotation speed NE* by using the rotation speed relational expression.

Then, the engine startup control processing means compares the engine rotation speed NE with a pre-set startup rotation speed NEth1, and determines whether the engine rotation speed NE is higher than the startup rotation speed NEth1. If the engine rotation speed NE is higher than the startup rotation speed NEth1, the engine startup control processing means performs fuel injection and ignition in the engine 11.

Subsequently, the generator rotation speed control processing means of the engine startup control processing means performs a generator rotation speed control process based on the target generator rotation speed NG*, so as to increase the generator rotation speed NG and therefore increase the engine rotation speed NE.

Then, the engine startup control processing means estimates a drive shaft torque TR/OUT, and determines a target drive motor torque TM*, and performs the drive motor control process, as in steps S24 to S26.

Furthermore, the engine startup control processing means adjusts the degree of throttle opening θ so that the engine rotation speed NE reaches the target engine rotation speed NE*. Next, in order to determine whether the engine 11 is normally driven, the engine startup control processing means determines whether the generator torque TG is smaller than a motoring torque TEth involved in the startup of the engine 11. Then, the means waits for a predetermined time to elapse with the generator torque TG remaining smaller than the motoring torque TEth.

If the engine rotation speed NE is less than or equal to the startup rotation speed NEth1, the generator rotation speed control processing means performs the generator rotation speed control process based on the target generator rotation speed NG*. Subsequently, the engine startup control processing means estimates a drive shaft torque TR/OUT, and determines a target drive motor torque TM*, and performs the drive motor control process as in steps S24 to S26.

Next, the flowchart of FIG. 18 will be described.

Step S14-1: It is determined whether the degree of throttle opening θ is 0 [%]. If the degree of throttle opening θ is 0 [%], the process proceeds to step S14-3. If the degree of throttle opening θ is not 0 [%], the process proceeds to step S14-2.

Step S14-2: The degree of throttle opening θ is set to 0 [%]. Then, the process returns to Step S14-1.

Step S14-3: The vehicle speed V is read.

Step S14-4: The operation point of the engine 11 is read.

Step S14-5: The target generator rotation speed NG* is determined.

Step S14-6: It is determined whether the engine rotation speed NE is higher than the startup rotation speed NEth1. If the engine rotation speed NE is higher than the startup rotation speed NEth1, the process proceeds to step S14-11. If the engine rotation speed NE is not higher than the startup rotation speed NEth1, the process proceeds to step S14-7.

Step S14-7: The generator rotation speed control process is performed.

Step S14-8: The drive shaft torque TR/OUT is estimated.

Step S14-9: The target drive motor torque TM* is determined.

Step S14-10: The drive motor control process is performed. Then, the process returns to Step S14-1.

Step S14-11: Fuel injection and ignition are performed.

Step S14-12: The generator rotation speed control process is performed.

Step S14-13: The drive shaft torque TR/OUT is estimated.

Step S14-14: The target drive motor torque TM* is determined.

Step S14-15: The drive motor control process is performed.

Step S14-16: The degree of throttle opening θ is adjusted.

Step S14-17: It is determined whether the generator torque TG is smaller than the motoring torque TEth. If the generator torque TG is smaller than the motoring torque TEth, the process proceeds to step S14-18. If the generator torque TG is not smaller than the motoring torque TEth, the process returns to Step S14-11.

Step S14-18: The elapse of a predetermined time is awaited. At the elapse, the process returns to step S14.

Figure 19:
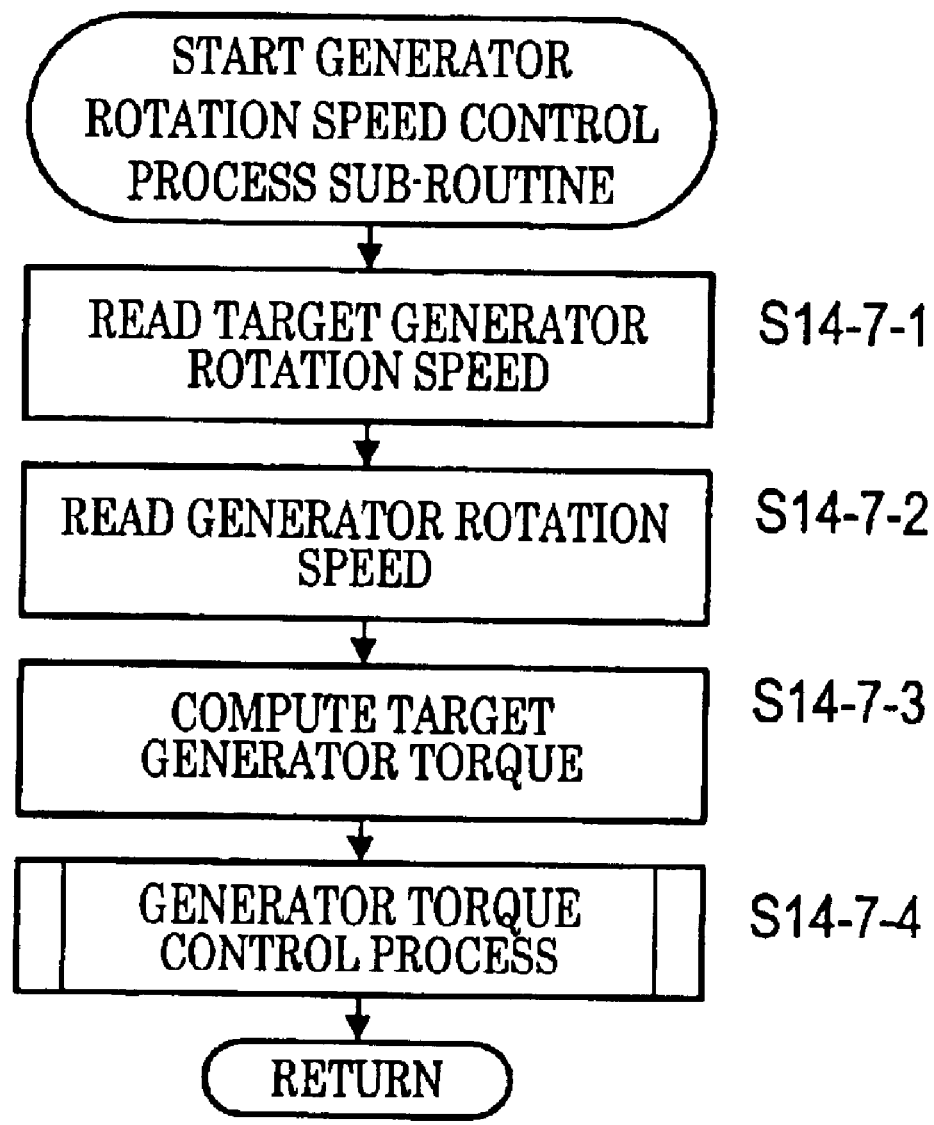
FIG. 19 is a chart illustrating the sub-routine of the generator rotation speed control process in the first embodiment of the invention.

Next described will be the sub-routine of the generator rotation speed control process of steps S14-7 and S14-12 found in FIG. 18. FIG. 19 is a chart illustrating the sub-routine.

First, the generator rotation speed control processing means reads the target generator rotation speed NG* and the generator rotation speed NG. The means performs a PI control based on a differential rotation speed ΔNG between the generator rotation speed NG and the target generator rotation speed NG*, and computes a target generator torque TG*. If the differential rotation speed ΔNG is greater, the target generator torque TG* is increased with the positive-negative sign being considered.

Subsequently, the generator torque control processing means of the generator rotation speed control processing means performs the generator torque control process illustrated in FIG. 17, thereby performing the torque control of the generator 16.

Next, the flowchart of FIG. 19 will be described. Because the same process is performed in Steps S14-7 and S14-12, Step S14-7 will be used to describe the process.

Step S14-7-1: The target generator rotation speed NG* is read.

Step S14-7-2: The generator rotation speed NG is read.

Step S14-7-3: The target generator torque TG* is computed.

Step S15-7-4: The generator torque control process is performed. Then, the process returns to step S14-7 or S14-12.

Figure 20:
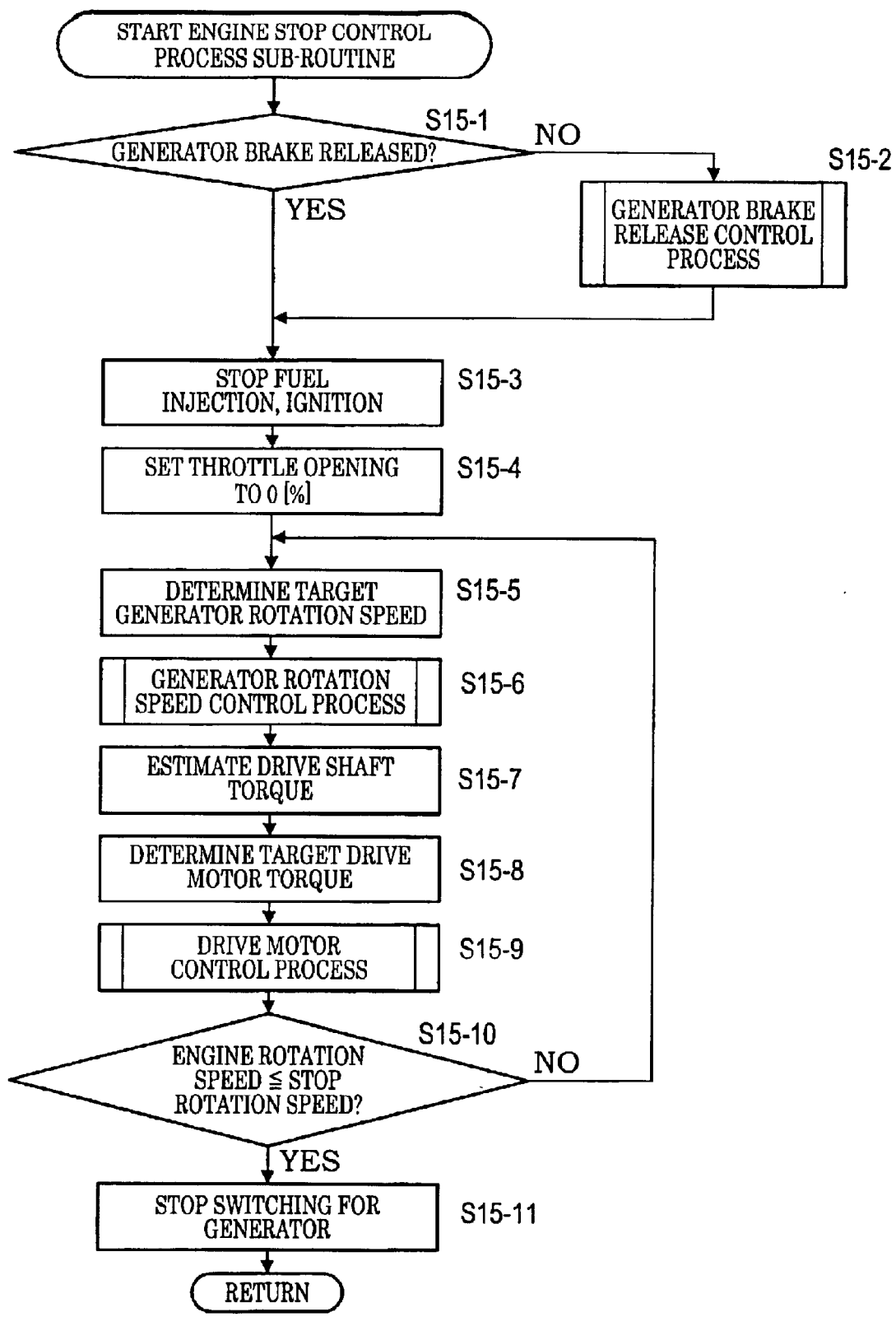
FIG. 20 is a chart illustrating the sub-routine of the engine stop control process in the embodiment of the invention.

Next described will be the sub-routine for the engine stop control process of step S15 in FIG. 8. FIG. 20 is a chart that illustrates the sub-routine.

First, the engine stop control processing means determines whether the generator brake B has been released (FIG. 6). If the generator brake B is not released, but is engaged, the generator brake release control processing means of the engine stop control processing means performs the generator brake release control process to release the generator brake B.

If the generator brake B is released, the engine stop control processing means stops fuel injection and ignition in the engine 11, and sets the degree of throttle opening θ to 0 [%].

Subsequently, the engine stop control processing means reads the ring gear rotation speed NR, and determines a target generator rotation speed NG* based on the ring gear rotation speed NR and the target engine rotation speed NE* (0 [rpm]), by using the rotation speed relational expression.

After the generator rotation speed control process, illustrated in FIG. 19, the engine stop control processing means estimates a drive shaft torque TR/OUT, and determines a target drive motor torque TM*, and performs the drive motor control process, as in steps S24 to S26.

Next, the engine stop control processing means determines whether the engine rotation speed NE is less than or equal to a stop rotation speed NEth2. If the engine rotation speed NE is less than or equal to the stop rotation speed NEth2, the switching for the generator 16 is stopped to shut down the generator 16.

Next, the flowchart of FIG. 20 is described.

Step S15-1: It is determined whether the generator brake B has been released. If the generator brake B is released, the process proceeds to step S15-3. If the generator brake B is not released, the process proceeds to step S15-2.

Step S15-2: The generator brake release control process is performed.

Step S15-3: Fuel injection and ignition are stopped.

Step S15-4: The degree of throttle opening θ is set to 0 [%].

Step S15-5: The target generator rotation speed NG* is determined.

Step S15-6: The generator rotation speed control process is performed.

Step S15-7: The drive shaft torque TR/OUT is estimated.

Step S15-8: The target drive motor torque TM* is determined.

Step S15-9: The drive motor control process is performed.

Step S15-10: It is determined whether the engine rotation speed NE is less than or equal to the stop rotation speed NEth2. If the engine rotation speed NE is less than or equal to the stop rotation speed NEth2, the process proceeds to step S15-11. If the engine rotation speed NE is greater than the stop rotation speed NEth2, the process returns to step S15-5.

Step S15-11: The switching for the generator 16 is stopped. Then, the process returns to step S15.

Figure 21:
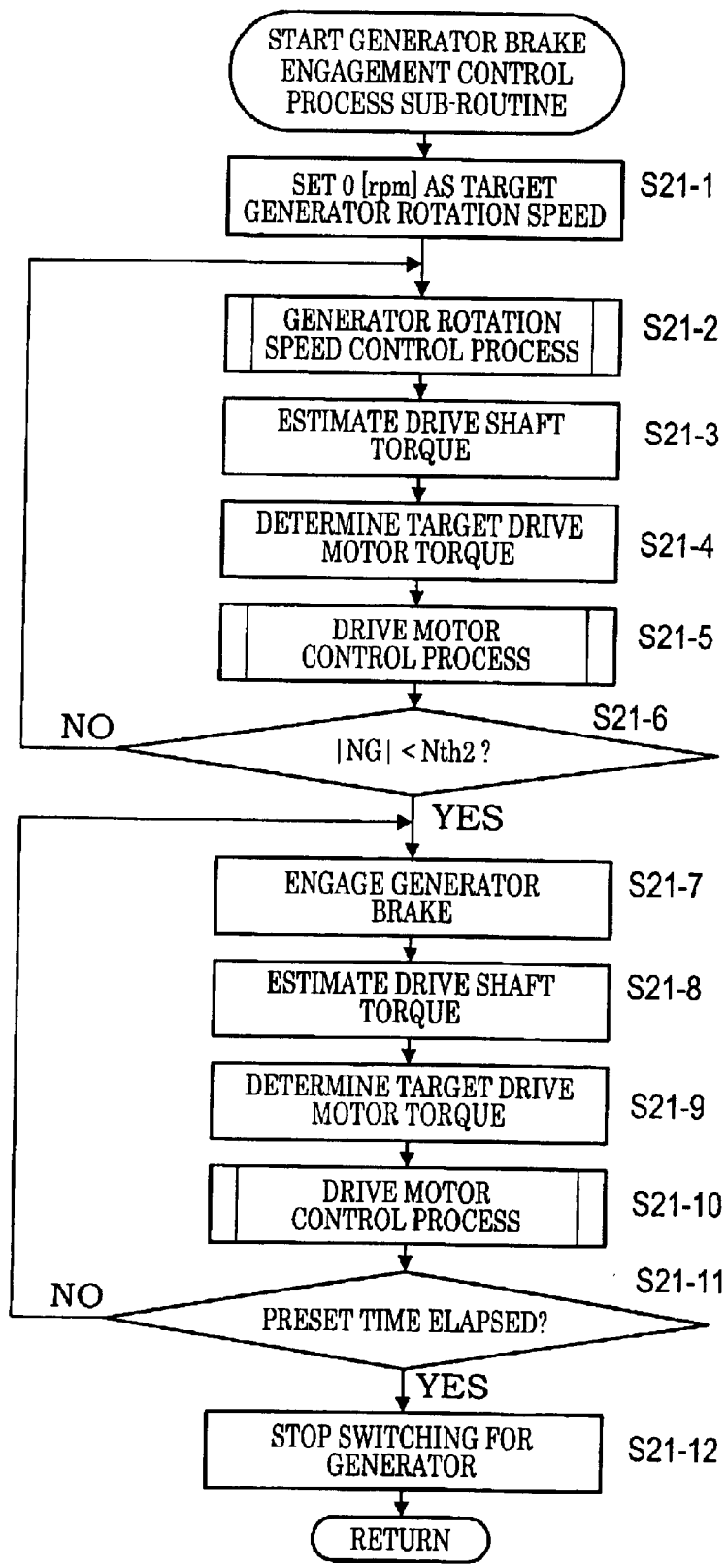
FIG. 21 is a chart illustrating the sub-routine of the generator brake engagement control process in the first embodiment of the invention.

Next described will be a sub-routine of the generator brake engagement control process of step S21 in FIG. 9. FIG. 21 is a chart illustrating the sub-routine.

First, the generator brake engagement control processing means switches a generator brake request for requesting engagement of the generator brake B (FIG. 6) from an off-status to an on-status, and sets 0 [rpm] as a target generator rotation speed NG*, and performs the generator rotation speed control process illustrated in FIG. 19. After that, as in steps S24 to S26, the generator brake engagement control processing means estimates a drive shaft torque TR/OUT, determines a target drive motor torque TM*, and performs the drive motor control process.

Next, the generator brake engagement control processing means determines whether the absolute value of the generator rotation speed NG is smaller than a predetermined second rotation speed Nth2 (e.g., 100 [rpm]). If the absolute value of the generator rotation speed NG is smaller than the second rotation speed Nth2, the means engages the generator brake. Subsequently, the generator brake engagement control processing means estimates a drive shaft torque TR/OUT, and determines a target drive motor torque TM*, and performs the drive motor control process, as in steps S24 to S26.

After a predetermined time elapses with the generator brake B remaining in an engaged state, the generator brake engagement control processing means stops the switching for the generator 16 to shut down the generator 16.

Next, the FIG. 21 flowchart will be described.

Step S21-1: The target generator rotation speed NG* is set at 0 [rpm].

Step S21-2: The generator rotation speed control process is performed.

Step S21-3: The drive shaft torque TR/OUT is estimated.

Step S21-4: The target drive motor torque TM* is determined.

Step S21-5: The drive motor control process is performed.

Step S21-6: It is determined whether the absolute value of the generator rotation speed NG is smaller than the second rotation speed Nth2. If the absolute value of the generator rotation speed NG is smaller than the second rotation speed Nth2, the process proceeds to step S21-7. If absolute value of the generator rotation speed NG is not smaller than the second rotation speed Nth2, the process returns to step S21-2.

Step S21-7: The generator brake B is engaged.

Step S21-8: The drive shaft torque TR/OUT is estimated.

Step S21-9: The target drive motor torque TM* is determined.

Step S21-10: The drive motor control process is performed.

Step S21-11: It is determined whether the predetermined time has elapsed. If the predetermined time has elapsed, the process proceeds to step S21-12. If the time has not elapsed, the process returns to step S21-7.

Step S21-12: The switching for the generator 16 is stopped. Then, the process returns to step S21.

Figure 22:
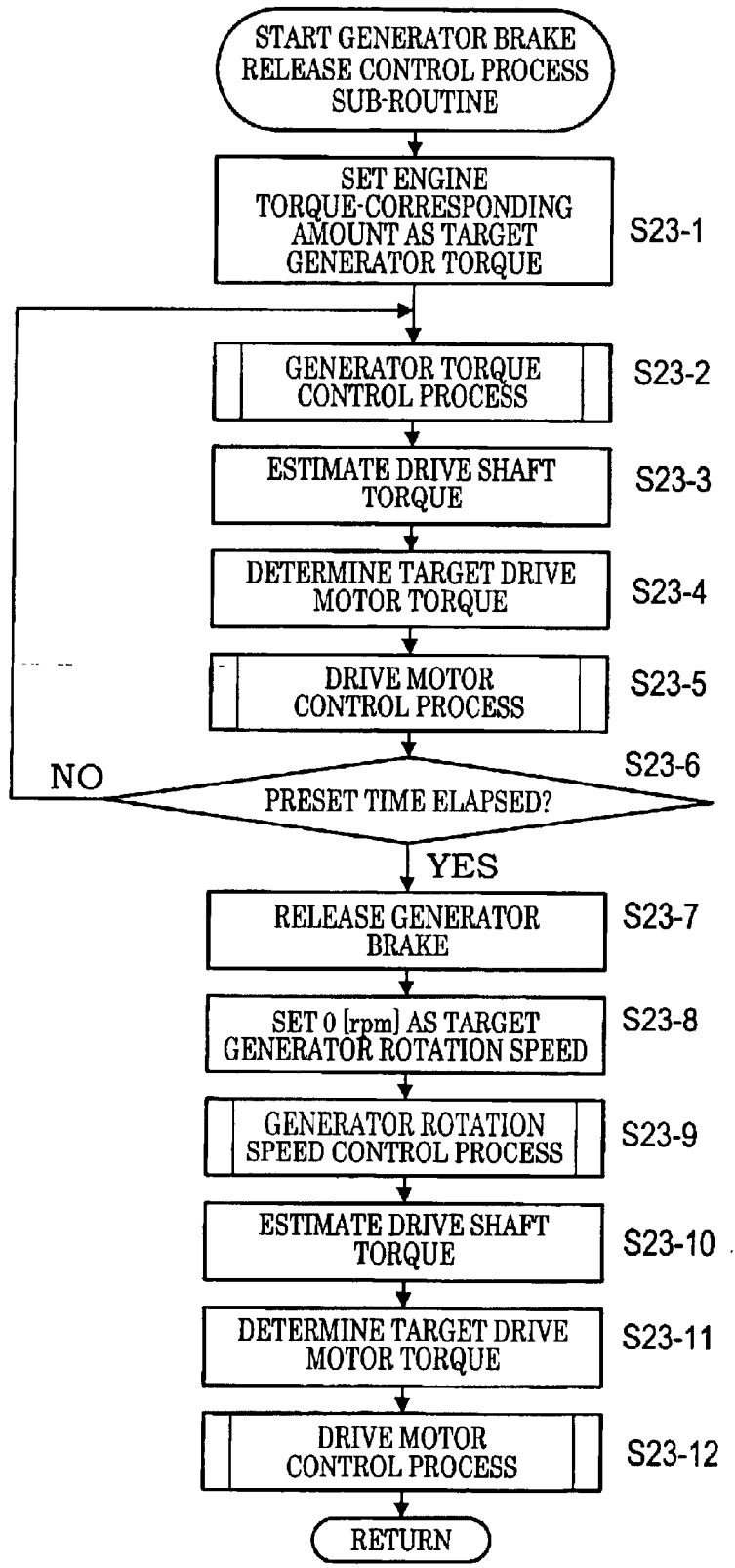
FIG. 22 is a chart illustrating the sub-routine of the generator brake release control process in the first embodiment of the invention.

Next to be described is the sub-routine of the generator brake release control process of step S23 in FIG. 9. FIG. 22 is a chart illustrating the sub-routine.

While the generator brake B (FIG. 6) is engaged in the generator brake release control process, a predetermined engine torque TE acts on the rotor 21 of the generator 16. Therefore, if the generator brake B is simply released, the engine torque TE is transferred to the rotor 21, so that the generator torque TG and the engine torque TE greatly change, thereby causing shocks.

Hence, in the engine control device 46, the engine torque TE transferred to the rotor 21 is estimated or computed. The generator brake release control processing means reads a torque corresponding to the estimated or computed engine torque TE, that is, the engine torque-corresponding amount, and sets the engine torque-corresponding amount as a target generator torque TG*. Subsequently, the generator brake release control processing means performs the generator torque control process illustrated in FIG. 17, and then estimates a drive shaft torque TR/OUT, determines a target drive motor torque TM*, and performs the drive motor control process as in steps S24 to S26.

At the elapse of a predetermined time following the start of the generator torque control process, the generator brake release control processing means releases the generator brake B. After setting the target generator rotation speed NG* at 0 [rpm], the means performs the generator rotation speed control process illustrated in FIG. 19. Subsequently, the generator brake release control processing means estimates a drive shaft torque TR/OUT, and determines a target drive motor torque TM*, and performs the drive motor control process as in steps S24 to S26. The aforementioned engine torque-corresponding amount is estimated or computed by learning the torque ratio of the generator torque TG to the engine torque TE.

Next, the flowchart of FIG. 22 will be described.

Step S23-1: The engine torque-corresponding amount is set as a target generator torque TG*.

Step S23-2: The generator torque control process is performed.

Step S23-3: The drive shaft torque TR/OUT is estimated.

Step S23-4: The target drive motor torque TM* is determined.

Step S23-5: The drive motor control process is performed.

Step S23-6: It is determined whether a predetermined time has elapsed. If the predetermined time has elapsed, the process proceeds to step S23-7. If the time has not elapsed, the process returns Step S23-2.

Step S23-7: The generator brake B is released.

Step S23-8: The target generator rotation speed NG* is set at 0 [rpm].

Step S23-9: The generator rotation speed control process is performed.

Step S23-10: The drive shaft torque TR/OUT is estimated.

Step S23-11: The target drive motor torque TM* is determined.

Step S23-12: The drive motor control process is performed. Then, the process returns to step S23.

Figure 23:
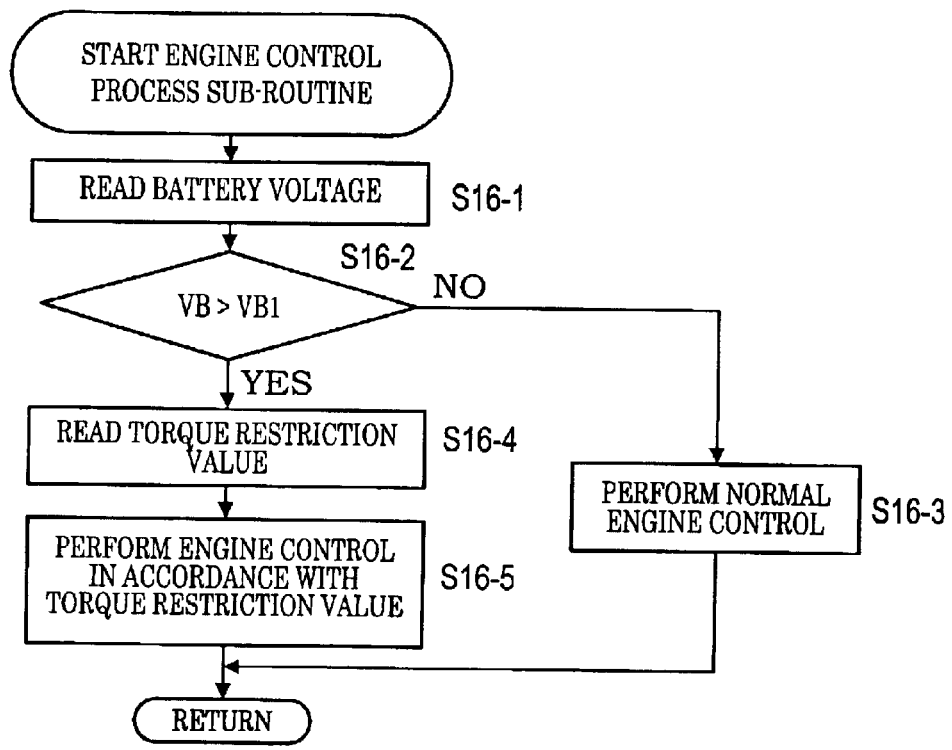
FIG. 23 is a chart illustrating a sub-routine of the engine control process in a second embodiment of the invention.
Figure 24:
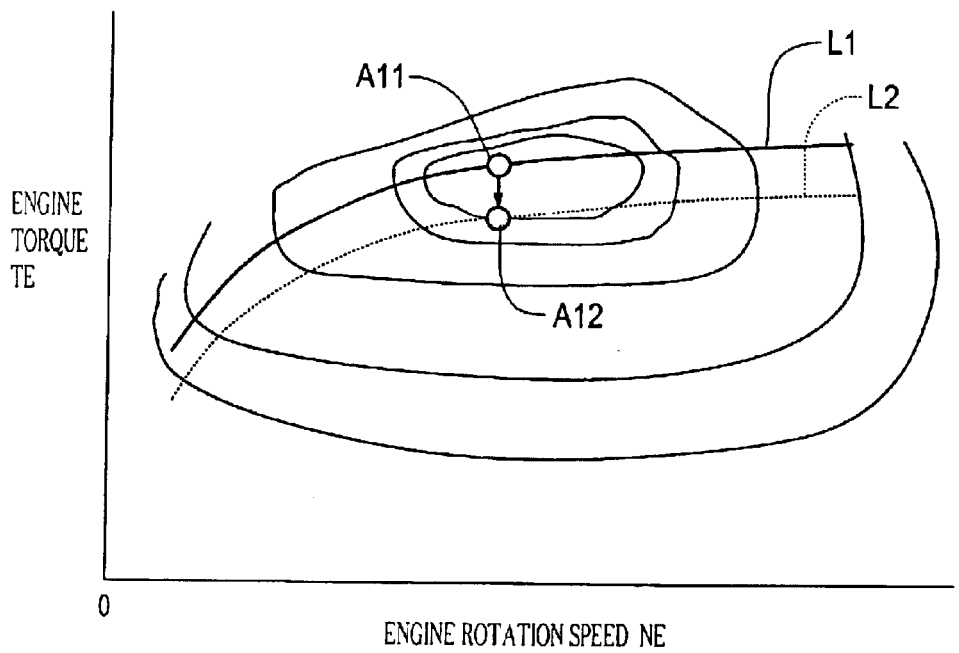
FIG. 24 is a diagram indicating an engine torque restriction map in the second embodiment of the invention.
Figure 25:
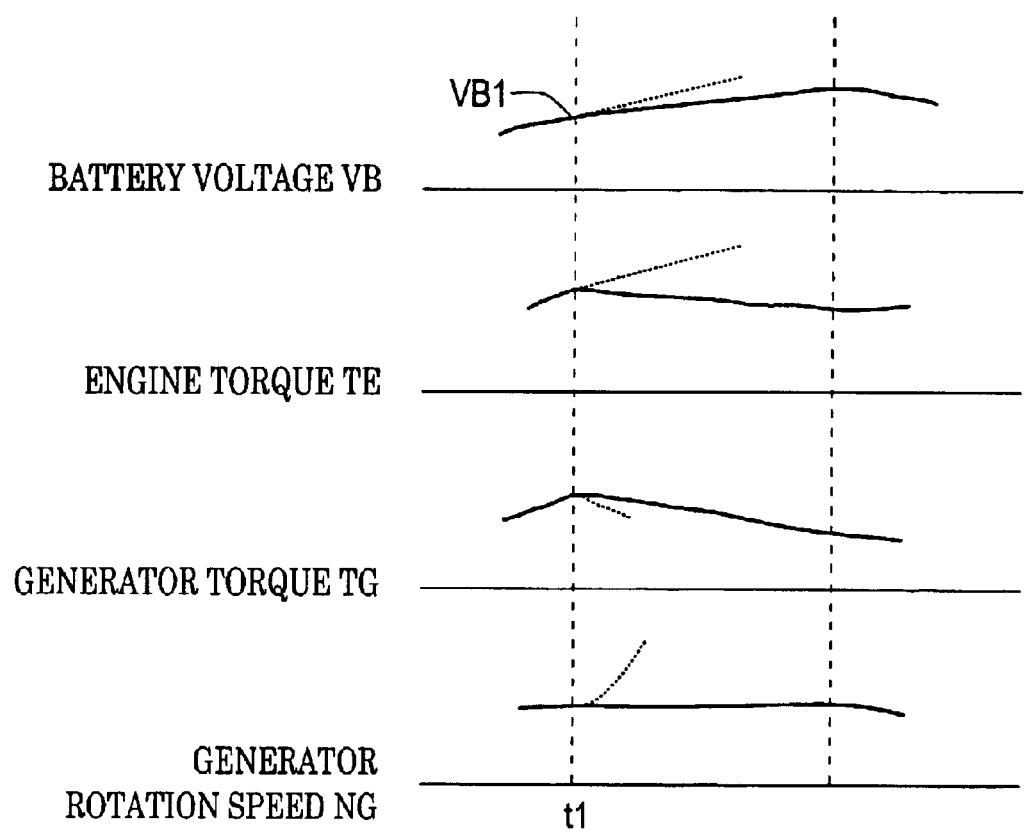
FIG. 25 is a time chart indicating the states of drive of the engine and the generator in the second embodiment of the invention.

A second embodiment of the invention will now be described. A sub-routine for the engine control process of step S16 in FIG. 8 will be described. FIG. 23 is a chart illustrating the sub-routine for the engine control process in the second embodiment of the invention. FIG. 24 is a diagram indicating an engine torque restriction map for the second embodiment of the invention and FIG. 25 is a time chart indicating the states of drive of the engine and the generator in the second embodiment of the invention. In FIG. 24, the horizontal axis indicates the engine rotation speed NE, and the vertical axis indicates the engine torque TE.

The engine torque restriction processing means as an electric machine torque restriction means of the engine control processing means performs the engine torque restriction process, in which the means reads the battery voltage VB, and determines whether the battery voltage VB is higher than the threshold value VB1. If the battery voltage VB is higher than the threshold value VB1, the engine torque restriction processing means restricts the engine torque TE. Therefore, the engine torque restriction processing means reads a torque restriction value TEmax, by referring to a not-shown engine torque restriction map recorded in the recording device in the vehicle control device 51 (FIG. 6). Hence, the engine control processing means controls the engine 11 in accordance with the torque restriction value TEmax. If the battery voltage VB is not higher than the threshold value VB1, the engine control processing means controls the engine 11. The engine torque TE is restricted by reducing the degree of throttle opening θ or reducing the supply of fuel to the engine 11.

Therefore, as indicated in FIG. 24, the engine 11 is driven at an operation point A11 determined based on an optimal fuel economy curve L1, if the engine torque TE is not restricted. If the engine torque TE is restricted, the engine 11 is driven at an operation point A12 determined based on an optimal fuel economy curve L2.

If the engine torque TE is restricted and therefore becomes low, the generator rotation speed NG momentarily rises. However, because the generator rotation speed NG is controlled by the speed control, the generator 16 reduces the generator torque TG so as to maintain the rotation speed as it has been. Thus, if the engine torque TE decreases, the generator torque TG also decreases following the engine torque TE. Therefore, increases in the load on the inverter 29 can be prevented.

The states of driving of the engine 11 and the generator 16 will be described. First, the generator rotation speed NG is changed from a negative value to a positive value, and the engine rotation speed NE and the engine torque TE are increased, so that the generator torque TG reaches an engine startup torque, thus starting the engine 11. Then, electricity is generated by the generator 16, and DC current is sent to the battery 43, so that the battery voltage VB gradually rises.

If the battery voltage VB becomes higher than the threshold value VB1 (350 V) at a timing t1, the engine torque TE is restricted, so that the generator torque TG is restricted following the engine torque TE. Therefore, the excessive driving of the generator 16 by the engine 11 is avoided, so that the generator rotation speed NG becomes stable.

Next, the flowchart of FIG. 23 will be described.

Step S16-1: The battery voltage VB is read.

Step S16-2: It is determined whether the battery voltage VB is higher than the threshold value VB1. If the battery voltage VB is higher than the threshold value VB1, the process proceeds to step S16-4. If the battery voltage VB is not higher than the threshold value VB1, the process proceeds to step S16-3.

Step S16-3: A normal control of the engine 11 is performed. Then, the process returns.

Step S16-4: The torque restriction value TEmax is read.

Step S16-5: The engine 11 is controlled in accordance with the torque restriction value TEmax. Then, the process returns.

The foregoing embodiments are described in conjunction with a case where the load on the inverter 29 becomes great in a hybrid type vehicle drive control apparatus which has an engine 11, a generator 16 and a drive motor 25 and in which the withstanding voltage of the inverter 29 for driving the drive motor 25 is set lower than the withstanding voltage of the inverter 28 for driving the generator 16. The embodiments are also applicable to a case where the load on an inverter for driving a generator 16 becomes great in a hybrid type vehicle drive control apparatus in which the withstanding voltage of the inverter for driving the generator 16 is set lower than the withstanding voltage of an inverter for driving the drive motor 25.

Furthermore, the embodiments are also applicable to a case where, in an electric vehicle drive apparatus equipped merely with a drive motor, the battery voltage becomes high and the load on an inverter for driving the drive motor becomes great. The embodiments are also applicable to a case where, in an electric vehicle which has a generator and a drive motor and in which the withstanding voltage of an inverter for driving the drive motor is set lower than the withstanding voltage of an inverter for driving the generator, the battery voltage becomes high and the load on the inverter for driving the drive motor becomes great.

The invention is not limited to the foregoing embodiments, but may be modified in various ways based on the concept of the invention. Such modifications are not excluded from the scope of the invention.

As described above in detail, according to the invention, an electric vehicle drive control apparatus has an electric machine; a battery; an inverter that is driven in accordance with a drive signal, and that receives a direct current from the battery, and produces a phase current, and supplies the phase current to the electric machine; battery voltage detection means for detecting a battery voltage; and electric machine torque restriction processing means for determining whether the battery voltage is higher than a threshold value, and for restricting an electric machine torque if the battery voltage is higher than the threshold value.

In this case, if the battery voltage is higher than the threshold value, the electric machine torque is restricted. Therefore, increases in the load on the inverter can be prevented.

Furthermore, the load on the inverter will not increase even in a case where, to drive the inverter, the switching of a transistor of the inverter is performed, and therefore, a surge voltage, which is a transient voltage, momentarily occurs, and the battery voltage becomes high.

Another electric vehicle drive control apparatus of the invention has an electric generator mechanically connected to an engine; a battery; an inverter that is driven in accordance with a drive signal, and that receives a direct current from the battery, and produces a phase current, and supplies the phase current to the electric generator; battery voltage detection means for detecting a battery voltage; and engine torque restriction processing means for determining whether the battery voltage is higher than a threshold value, and for restricting an engine torque if the battery voltage is higher than the threshold value.

In this case, if the engine torque is restricted and therefore becomes low, the generator rotation speed momentarily becomes high. However, because the generator rotation speed is controlled by a speed control, the generator reduces the generator torque so as to maintain the rotation speed as it has been. Thus, if the engine torque becomes low, the generator torque also becomes low following the engine torque. Therefore, increases in the load on the inverter can be prevented.

While the invention has been described with reference to what are presently considered to be preferred embodiments thereof, it is to be understood that the invention is not limited to the disclosed embodiments or structures. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention.

What is claimed is:

1. An electric vehicle drive control apparatus, comprising:
   a drive source;
   a battery;
   an inverter that is driven in accordance with a drive signal, and that receives a direct current from the battery, and produces a phase current, and supplies the phase current to the drive source;
   a battery voltage detection device that detects a battery voltage; and
   a drive source torque restriction processing device that determines whether the battery voltage is higher than a threshold value, and restricts a drive source torque if the battery voltage is higher than the threshold value to prevent applying an increase in a voltage to the inverter.

2. The electric vehicle drive control apparatus, according to claim 1, wherein the drive source is an electric machine.

3. The electric vehicle drive control apparatus, according to claim 1, wherein the drive source is an engine mechanically connected to an electric generator, the inverter supplies the phase current to the electric generator, and
   the engine torque restriction processing device restricts an engine torque upon determining that the battery voltage is higher than a threshold value.

4. An electric vehicle drive control apparatus according to claim 3, further comprising a planetary gear unit having at least first to third gear elements, wherein the first gear element is connected to the electric generator, and the third gear element is connected to the engine.

5. An electric vehicle drive control apparatus according to claim 4, further comprising a drive motor mechanically connected to the engine and the electric generator.

6. An electric vehicle drive control apparatus according to claim 3, further comprising a drive motor mechanically connected to the engine and the electric generator.

7. The electric vehicle drive control apparatus according to claim 1, wherein the voltage applied to the inverter does not increase when a transistor of the inverter is switched.

8. An electric vehicle drive control method of an electric vehicle drive control apparatus having a drive source; a battery; and an inverter that is driven in accordance with a drive signal, and that receives a direct current from the battery, and produces a phase current, and supplies the phase current to the drive source, the electric vehicle drive control method comprising:
   detecting a battery voltage;
   determining whether the battery voltage is higher than a threshold value; and
   restricting a drive source torque if the battery voltage is higher than the threshold value to prevent applying an increase in a voltage to the inverter.

9. The electric vehicle drive control method according to claim 8, wherein the drive source is an electric machine.

10. The electric vehicle drive control method according to claim 8, wherein the drive source is an engine mechanically connected to an electric generator, and, in the restricting step an engine torque is restricted.

11. The electric vehicle drive control method according to claim 8, wherein the voltage applied to the inverter does not increase when a transistor of the inverter is switched.

12. A program of an electric vehicle drive control method, wherein a computer functions as:
    a battery voltage detection device that detects a battery voltage; and
    a drive source torque restriction processing device that determines whether the battery voltage is higher than a threshold value, and for restricting a drive source torque if the battery voltage is higher than the threshold value to prevent applying an increase in a voltage to the inverter.

13. The program of an electric vehicle drive control method according to claim 12, wherein the drive source is an electric machine.

14. The program of an electric vehicle drive control method according to claim 12, wherein the drive source is an engine mechanically connected to a generator and the
    engine torque restriction processing device, when it determines the battery voltage is higher than the threshold value, restricts an engine torque.

15. The program of an electric vehicle drive control method according to claim 12, wherein the voltage applied to the inverter does not increase when a transistor of the inverter is switched.

* * * * *

UNITED STATES PATENT AND TRADEMARK OFFICE
CERTIFICATE OF CORRECTION

PATENT NO. : 6,902,018 B2
DATED : June 7, 2005
INVENTOR(S) : Hideki Hisada, Kazuo Aoki and Shitomi Yanagawa It is certified that error appears in the above-identified patent and that said Letters Patent is hereby corrected as shown below:

Title page,
Item [73], Assignee, replace "Aisin AW" with -- Aisin AW Co. Ltd. --.

Signed and Sealed this

Twentieth Day of December, 2005

JON W. DUDAS
*Director of the United States Patent and Trademark Office*